(12) United States Patent
Yoshimura et al.

(10) Patent No.: US 11,997,694 B2
(45) Date of Patent: May 28, 2024

(54) TERMINAL DEVICES, BASE STATION DEVICES, AND COMMUNICATION METHODS

(71) Applicant: Sharp Kabushiki Kaisha, Sakai (JP)

(72) Inventors: Tomoki Yoshimura, Sakai (JP); Shoichi Suzuki, Sakai (JP); Toshizo Nogami, Sakai (JP); Huifa Lin, Sakai (JP); Daiichiro Nakashima, Sakai (JP); Wataru Ouchi, Sakai (JP); Taewoo Lee, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 346 days.

(21) Appl. No.: 17/633,281

(22) PCT Filed: Aug. 7, 2020

(86) PCT No.: PCT/JP2020/030922
§ 371 (c)(1),
(2) Date: Feb. 7, 2022

(87) PCT Pub. No.: WO2021/029437
PCT Pub. Date: Feb. 18, 2021

(65) Prior Publication Data
US 2022/0353900 A1 Nov. 3, 2022

(30) Foreign Application Priority Data

Aug. 9, 2019 (JP) .................................. 2019-147909

(51) Int. Cl.
*H04W 72/23* (2023.01)
*H04L 5/00* (2006.01)
*H04W 74/00* (2009.01)

(52) U.S. Cl.
CPC ........... *H04W 72/23* (2023.01); *H04L 5/0053* (2013.01); *H04W 74/006* (2013.01)

(58) Field of Classification Search
CPC .... H04W 72/23; H04W 74/006; H04L 5/0053
(Continued)

(56) References Cited

U.S. PATENT DOCUMENTS

2017/0331670 A1* 11/2017 Parkvall ............... H04B 7/0617
2019/0254013 A1* 8/2019 Chang ........................ H04L 5/00
2020/0260450 A1* 8/2020 Ji ........................... H04L 5/0091

* cited by examiner

*Primary Examiner* — Hermon Asres
(74) *Attorney, Agent, or Firm* — Keating & Bennett, LLP

(57) ABSTRACT

The PUSCH is scheduled by a random-access response grant included in the random-access response, $M_L$ interlaces are configured for the active UL BWP, $I_L^{th}$ interlace in the $M_L$ interlaces includes a set of resource blocks with index $I_{VRB}$ each of which satisfies relationship $l_L = \mathrm{mod}(I_{VRB} + N^{start,u}_{BWP,i}, M_L)$, the $N^{start,u}_{BWP,i}$ is a starting common resource block of the active UL BWP with index i, resource block assignment information in the random-access response grant indicates one or more interlaces from the $M_L$ interlaces, a first resource blocks assigned for the PUSCH in a case that the active UL BWP is different from an initial UL BWP are resource blocks in the one or more interlaces in the initial UL BWP, and a second resource blocks assigned for the PUSCH in a case that the active UL BWP is the initial UL BWP are same as the first resource blocks.

3 Claims, 17 Drawing Sheets

(58) Field of Classification Search
USPC .......................................................... 370/329
See application file for complete search history.

Figure 2A: Number of OFDM symbols per slot, slots per frame, and slots per subframe for normal cyclic prefix

| u | $N_{symb}^{slot}$ | $N_{slot}^{frame,u}$ | $N_{slot}^{subframe,u}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Figure 2B: Number of OFDM symbols per slot, slots per frame, and slots per subframe for extended cyclic prefix

| u | $N_{symb}^{slot}$ | $N_{slot}^{frame,u}$ | $N_{slot}^{subframe,u}$ |
|---|---|---|---|
| 2 | 12 | 40 | 4 |

Figure 2

Figure 13A: VRB domain

Figure 13B: PRB domain

TERMINAL DEVICES, BASE STATION DEVICES, AND COMMUNICATION METHODS

TECHNICAL FIELD

The present invention relates to a terminal device, a base station device, and a communication method.

BACKGROUND ART

In the 3rd Generation Partnership Project (3GPP), a radio access method and a radio network for cellular mobile communications (hereinafter, referred to as Long Term Evolution, or Evolved Universal Terrestrial Radio Access) have been studied. In LTE (Long Term Evolution), a base station device is also referred to as an evolved NodeB (eNodeB), and a terminal device is also referred to as a User Equipment (UE). LTE is a cellular communication system in which multiple areas are deployed in a cellular structure, with each of the multiple areas being covered by a base station device. A single base station device may manage multiple cells. Evolved Universal Terrestrial Radio Access is also referred as E-UTRA.

In the 3GPP, the next generation standard (New Radio: NR) has been studied in order to make a proposal to the International-Mobile-Telecommunication-2020 (IMT-2020) which is a standard for the next generation mobile communication system defined by the International Telecommunications Union (ITU). NR has been expected to satisfy a requirement considering three scenarios of enhanced Mobile BroadBand (eMBB), massive Machine Type Communication (mMTC), and Ultra Reliable and Low Latency Communication (URLLC), in a single technology framework.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

BRIEF DESCRIPTION OF THE DRAWINGS

FIG. 2 is an example showing the relationship between subcarrier-spacing configuration u, a number of OFDM symbols per slot $N^{slot}_{symb}$, and the CP configuration according to an aspect of the present embodiment;

DESCRIPTION OF EMBODIMENTS

Floor (AX) may be a floor function for a real number AX. For example, floor (AX) may be a function that provides the largest integer within the range that does not exceed the real number AX. Ceil (BX) may be a ceiling function to a real number BX. For example, ceil (BX) may be a function that provides the smallest integer within the range not less than the real number BX. Mod (CX, DX) may be a function that provides the remainder obtained by dividing CX by DX. Here, the CX is a real number. Also, the DX is a real number. Mod (CX, DX) may be a function that provides a value which corresponds to the remainder of dividing CX by DX. It is exp (EX)=e^(EX). Here, the e is Napier number. Also, the EX is a complex number or a real number. (FX)^(GX) indicates GX to the power of FX. Here, FX is a complex number or a real number.

In a wireless communication system according to one aspect of the present embodiment, at least OFDM (Orthogonal Frequency Division Multiplex) is used. An OFDM symbol is a unit of time domain of the OFDM. The OFDM symbol includes at least one or more subcarriers. An OFDM symbol is converted to a time-continuous signal in baseband signal generation. In downlink, at least CP-OFDM (Cyclic Prefix-Orthogonal Frequency Division Multiplex) is used. In uplink, either CP-OFDM or DFT-s-OFDM (Discrete Fourier Transform-spread-Orthogonal Frequency Division Multiplex) is used. DFT-s-OFDM may be given by applying transform precoding to CP-OFDM. The transform precoding may be a kind of DFT (Discrete Fourier Transform). CP-OFDM is OFDM using CP (Cyclic Prefix). DFT-s-OFDM also uses CP.

The OFDM symbol may be a designation including a CP added to the OFDM symbol before CP addition. That is, an OFDM symbol may be configured to include the OFDM symbol and a CP added to the OFDM symbol before CP addition.

Figure 1:
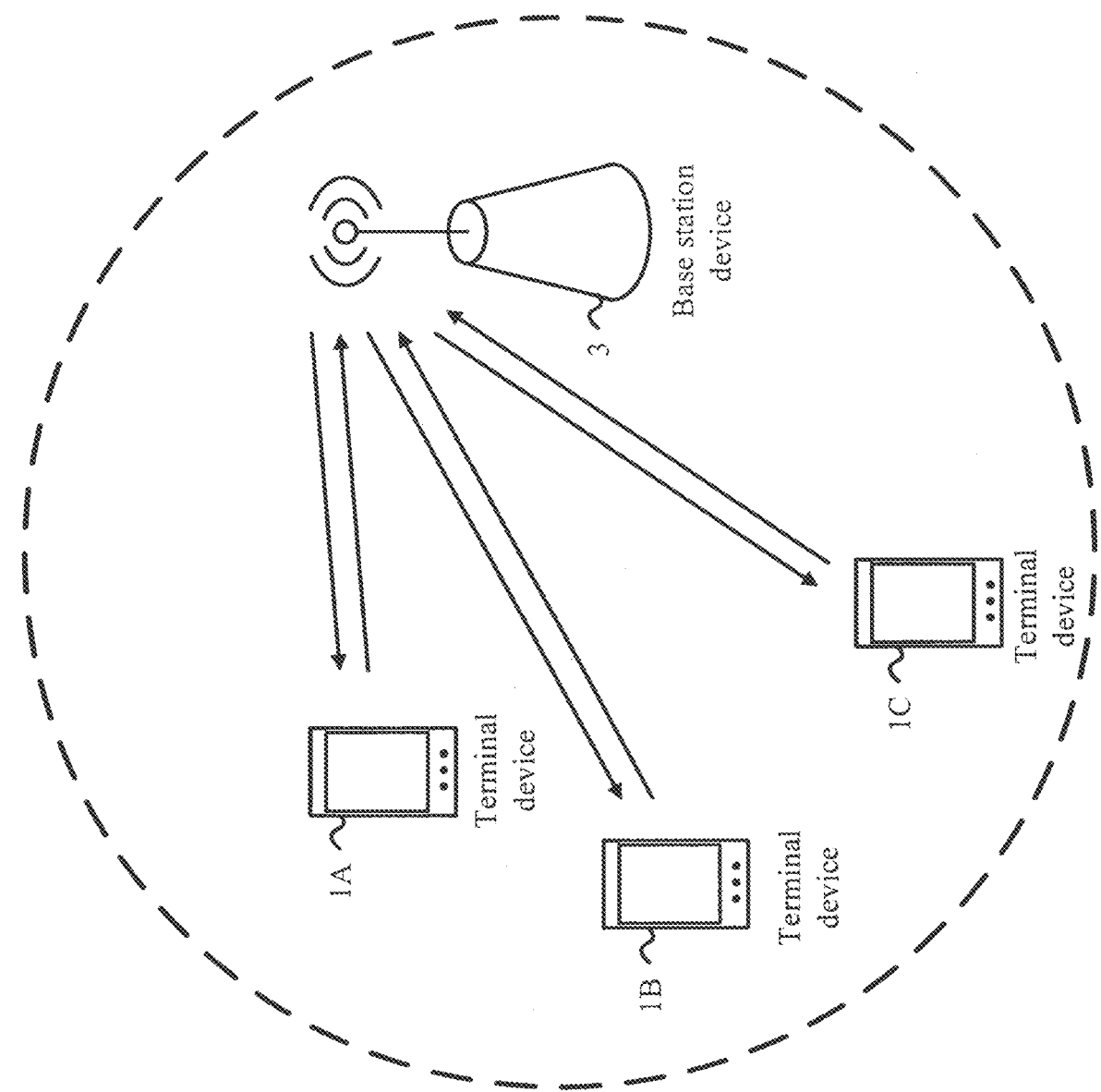
FIG. 1 is a conceptual diagram of a wireless communication system according to an aspect of the present embodiment.

FIG. 1 is a conceptual diagram of a wireless communication system according to an aspect of the present embodiment. In FIG. 1, the wireless communication system includes at least terminal device 1A to 1C and a base station device 3 (BS #3: Base station #3). Hereinafter, the terminal devices 1A to 1C are also referred to as a terminal device 1 (UE #1: User Equipment #1).

The base station device 3 may be configured to include one or more transmission devices (or transmission points, reception devices, reception points). When the base station device 3 is configured by a plurality of transmission devices, each of the plurality of transmission devices may be arranged at a different position.

The base station device 3 may provide one or more serving cells. A serving cell may be defined as a set of resources used for wireless communication. A serving cell is also referred to as a cell.

A serving cell may be configured to include at least one or both of a downlink component carrier (downlink carrier) and a uplink component carrier (uplink carrier). A serving cell may be configured to include at least two or more downlink component carriers and/or two or more uplink component carriers. A downlink component carrier and an uplink component carrier are also referred to as component carrier (carrier).

For example, a resource grid may be provided for a component carrier. For example, a resource grid may be provided for a combination of a component carrier and a subcarrier-spacing configuration u. A subcarrier-spacing configuration u is also referred to as numerology or subcarrier-spacing. A resource grid includes $N^{size, u}_{grid, x} N^{RB}_{sc}$ subcarriers. The resource grid starts from a common resource block with index $W^{start,u}_{grid}$. The common resource block with the index $N^{start, u}_{grid}$ is also referred to as a reference point of the resource grid. The resource grid includes $N^{subframe, u}_{symb}$ OFDM symbols. The subscript x indicates the transmission direction. The transmission direction may be either downlink or uplink. A resource grid is provided for a combination of an antenna port p, a subcarrier-spacing configuration u, and a transmission direction x.

$N^{size, u}_{grid,x}$ and $N^{start, u}_{grid}$ are given at least based on a higher-layer parameter (e.g. referred to as higher-layer parameter CarrierBandwidth). The higher-layer parameter is used to define one or more SCS (SubCarrier-Spacing) specific carriers. A resource grid corresponds to a SCS-specific carrier. A component carrier may comprise one or more SCS-specific carriers. The SCS-specific carrier may be indicated by a system information block (SIB). For each SCS-specific carrier, a subcarrier-spacing configuration u may be provided.

FIG. 2 is an example showing the relationship between subcarrier-spacing configuration u, a number of OFDM symbols per slot $N^{slot}_{symb}$, and the CP configuration according to an aspect of the present embodiment. In FIG. 2A, for example, when the subcarrier-spacing configuration u is set to 2 and the CP configuration is set to normal CP (normal cyclic prefix), $N^{slot}_{symb}=14$, $N^{frame, u}_{slot}=40$, $N^{subframe, u}_{slot}=4$. Further, in FIG. 2B, for example, when the subcarrier-spacing configuration u is set to 2 and the CP configuration is set to an extended CP (extended cyclic prefix), $N^{slot}_{symb}=12$, $N^{frame, u}_{slot}=40$, $N^{subframe, u}_{slot}=4$.

In the wireless communication system according to an aspect of the present embodiment, a time unit $T_c$ may be used to represent the length in the time domain. The time unit $T_c$ is $T_c=1/(df_{max}*N_f)$. It is $df_{max}=480$ kHz. It is $N_f=4096$. The constant k is $k=df_{max}*N_f/(df_{ref}N_{f, ref})=64$. $df_{ref}$ is 15 kHz. $N_{f, ref}$ is 2048.

Transmission of signals in the downlink/uplink may be organized into radio frames (system frames, frames) of length $T_f$. It is $T_f=(df_{max} N_f/100)*T_s=10$ ms. A radio frame is configured to include ten subframes. The subframe length is $T_{sf}=(df_{max}N_f/1000) T_s=1$ ms. A number of OFDM symbols per subframe is $N^{subframe, u}_{symb}=N^{slot}_{symb}N^{subframe, u}_{slot}$.

For a subcarrier-spacing configuration u, a number of slots included in a subframe and indexes may be given. For example, slot index $n^u_s$ may be given in ascending order with an integer value ranging from 0 to $N^{subframe,u}_{slot}-1$ in a subframe. For subcarrier-spacing configuration u, a number of slots included in a radio frame and indexes of slots included in the radio frame may be given. Also, the slot index $n^u_{s, f}$ may be given in ascending order with an integer value ranging from 0 to $N^{frame,u}_{slot}-1$ in a radio frame. Consecutive $N^{slot}_{symb}$ OFDM symbols may be included in one slot. It is $N^{slot}_{symb}=14$.

Figure 3:
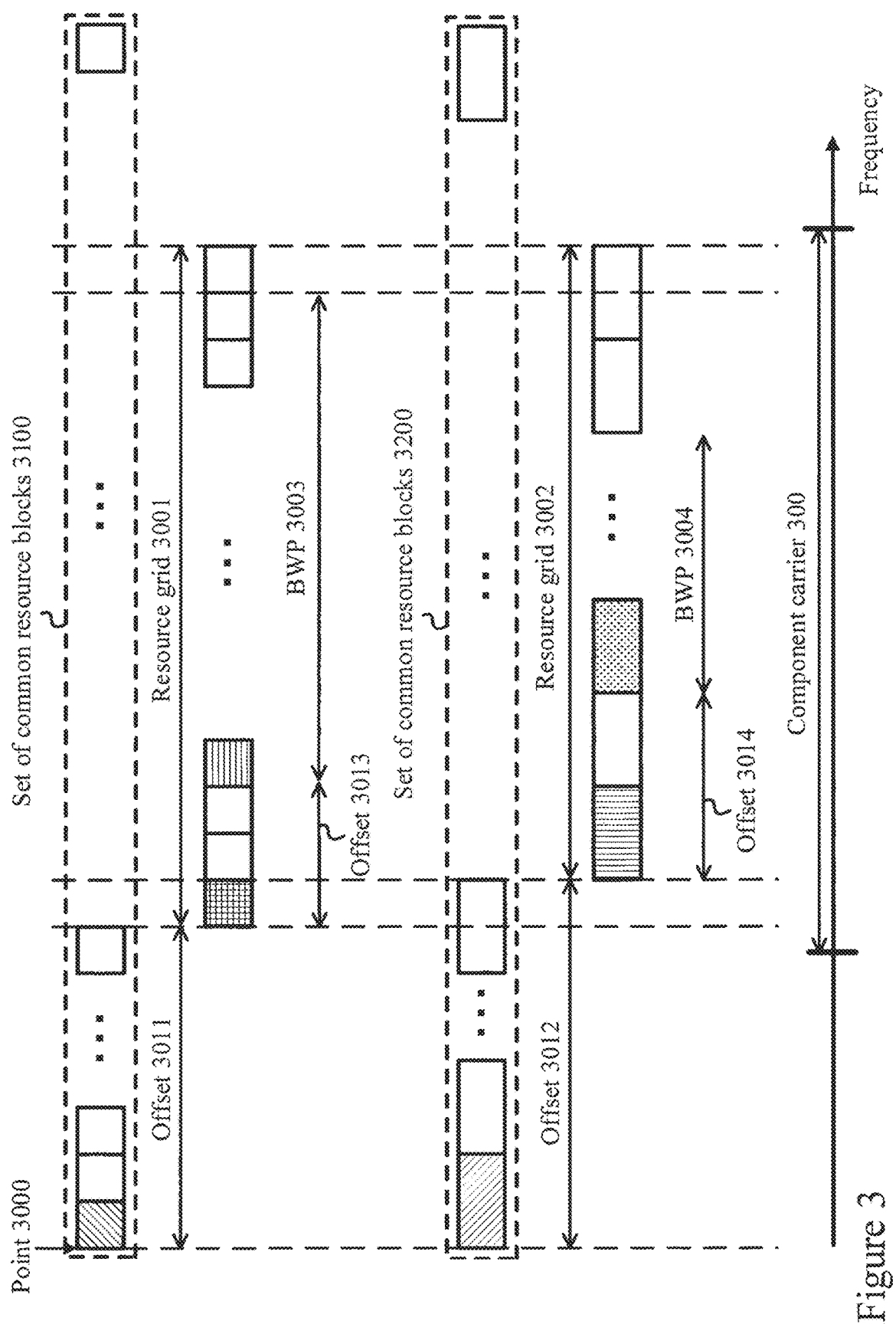
FIG. 3 is a diagram showing an example of a method of configuring a resource grid according to an aspect of the present embodiment.

FIG. 3 is a diagram showing an example of a method of configuring a resource grid according to an aspect of the present embodiment. The horizontal axis in FIG. 3 indicates frequency domain. FIG. 3 is a configuration example of a resource grid of subcarrier-spacing configuration u=u₁ in the component carrier 300 and a configuration example of a resource grid of subcarrier-spacing configuration u=u₂ in the component carrier 300. One or more subcarrier-spacing configuration u may be set for a component carrier. Although it is assumed in FIG. 3 that u₁=u₂-1, various aspects of this embodiment are not limited to the condition of u₁=u₂-1.

Point (Point) 3000 is an identifier for identifying a subcarrier. Point 3000 is also referred to as point A. The common resource block-set (CRB-set) 3100 is a set of common resource blocks for the subcarrier-spacing configuration u₁.

Among the common resource block-set 3100, the common resource block including the point 3000 (the block indicated by the upper right diagonal line in FIG. 3) is also referred to as a reference point of the common resource block-set 3100. The reference point of the common resource block-set 3100 may be a common resource block with index 0 in the common resource block-set 3100.

The offset 3011 is an offset from the reference point of the common resource block-set 3100 to the reference point of the resource grid 3001. The offset 3011 is indicated by a number of common resource blocks which is relative to the subcarrier-spacing configuration u₁. The resource grid 3001 includes $N^{size,u}_{grid1,x}$ common resource blocks starting from the reference point of the resource grid 3001.

The offset 3013 is an offset from the reference point of the resource grid 3001 to the reference point ($N^{start,u}_{BWP,i1}$) of the BWP (BandWidth Part) 3003 of the index i1.

Common resource block-set 3200 is a set of common resource blocks for the subcarrier-spacing configuration u₂.

A common resource block including the point 3000 (the block indicated by the upper left diagonal line in FIG. 3) in the common resource block-set 3200 is also referred to as a reference point of the common resource block-set 3200. The reference point of the common resource block-set 3200 may be a common resource block with index 0 in the common resource block-set 3200.

The offset 3012 is an offset from the reference point of the common resource block-set 3200 to the reference point (the block indicated by the vertical line) of the resource grid 3002. The offset 3012 is indicated by the number of common resource blocks for subcarrier-spacing configuration $u=u_2$. The resource grid 3002 includes $N^{size,u}_{grid2,x}$ common resource blocks starting from the reference point of the resource grid 3002.

The offset 3014 is an offset from the reference point of the resource grid 3002 to the reference point ($N^{start,u}_{BWP,i2}$) of the BWP 3004 with index $i_2$.

Figure 4:
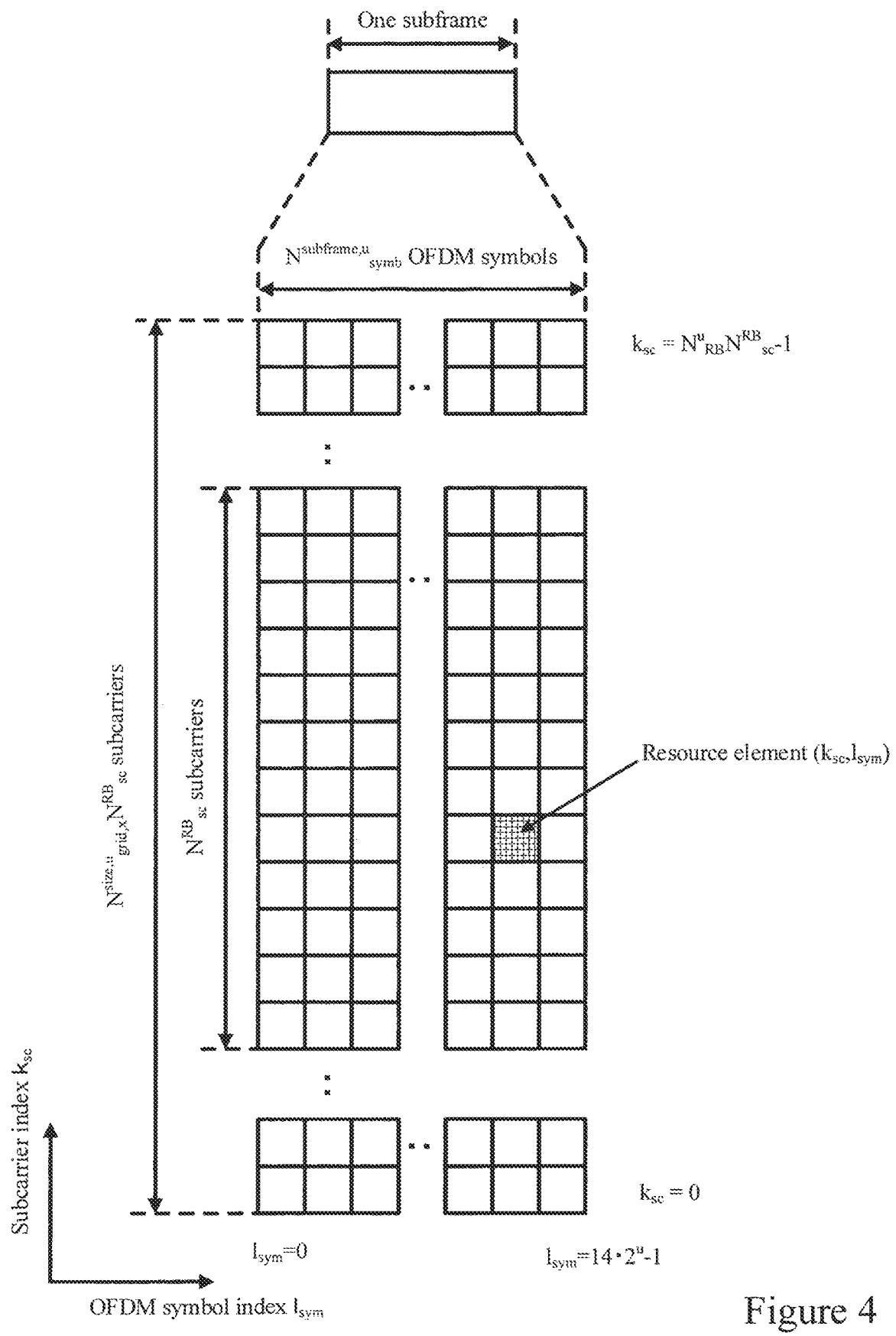
FIG. 4 is a diagram showing a configuration example of a resource grid 3001 according to an aspect of the present embodiment.

FIG. 4 is a diagram showing a configuration example of the resource grid 3001 according to an aspect of the present embodiment. In the resource grid of FIG. 4, the horizontal axis indicates OFDM symbol index $l_{sym}$, and the vertical axis indicates the subcarrier index $k_{sc}$. The resource grid 3001 includes $N^{size,u}_{grid1,x} N^{RB}_{sc}$ subcarriers, and includes $N^{subframes,u}_{symb}$ OFDM symbols. A resource identified by the subcarrier index $k_{sc}$ and the OFDM symbol index $l_{sym}$ in a resource grid is also referred to as a resource element (RE: Resource Element).

A resource block (RB: Resource Block) includes $N^{RB}_{sc}$ consecutive subcarriers. A resource block is a generic name of a common resource block, a physical resource block (PRB: Physical Resource Block), and a virtual resource block (VRB: Virtual Resource Block). It is $N^{RB}_{sc}=12$.

A resource block unit is a set of resources that corresponds to a OFDM symbol in a resource block. That is, a resource block unit includes 12 resource elements which corresponds to a OFDM symbol in a resource block.

Common resource blocks for a subcarrier-spacing configuration u are indexed in ascending order from 0 in the frequency domain in a common resource block-set. The common resource block with index 0 for the subcarrier-spacing configuration u includes (or collides with, matches) the point 3000.

Physical resource blocks for a subcarrier-spacing configuration u are indexed in ascending order from 0 in the frequency domain in a BWP. The index $n^u_{PRB}$ of the physical resource block with respect to the subcarrier-spacing configuration u satisfies the relationship of $n^u_{CRB}=n^u_{PRB}+N^{start,u}_{BWP,i}$. The $N^{start,u}_{BWP,i}$ indicates the reference point of BWP with index i.

Virtual resource blocks for a subcarrier-spacing configuration u are indexed in ascending order from 0 in the frequency domain in a BWP.

A BWP is defined as a subset of common resource blocks included in the resource grid. The BWP includes $N^{size,u}_{BWP,i}$ common resource blocks starting from the reference points $N^{start,u}_{BWP,i}$. A BWP for the downlink component carrier is also referred to as a downlink BWP. A BWP for the uplink component carrier is also referred to as an uplink BWP.

An antenna port is defined such that the channel over which a symbol on the antenna port is conveyed can be inferred from the channel over which another symbol on the same antenna port is conveyed. For example, the channel may correspond to a physical channel. For example, the symbols may correspond to OFDM symbols. For example, the symbols may correspond to resource block units. For example, the symbols may correspond to resource elements.

Two antenna ports are said to be QCL (Quasi Co-Located) if the large-scale properties of the channel over which a symbol on one antenna port is conveyed can be inferred from the channel over which a symbol on the other antenna port is conveyed. The large-scale properties include a part or all of delay spread, Doppler spread, Doppler shift, average gain, average delay, and spatial Rx parameters.

Carrier aggregation may be communication using a plurality of aggregated serving cells. Carrier aggregation may be communication using a plurality of aggregated component carriers. Carrier aggregation may be communication using a plurality of aggregated downlink component carriers. Carrier aggregation may be communication using a plurality of aggregated uplink component carriers.

Figure 5:
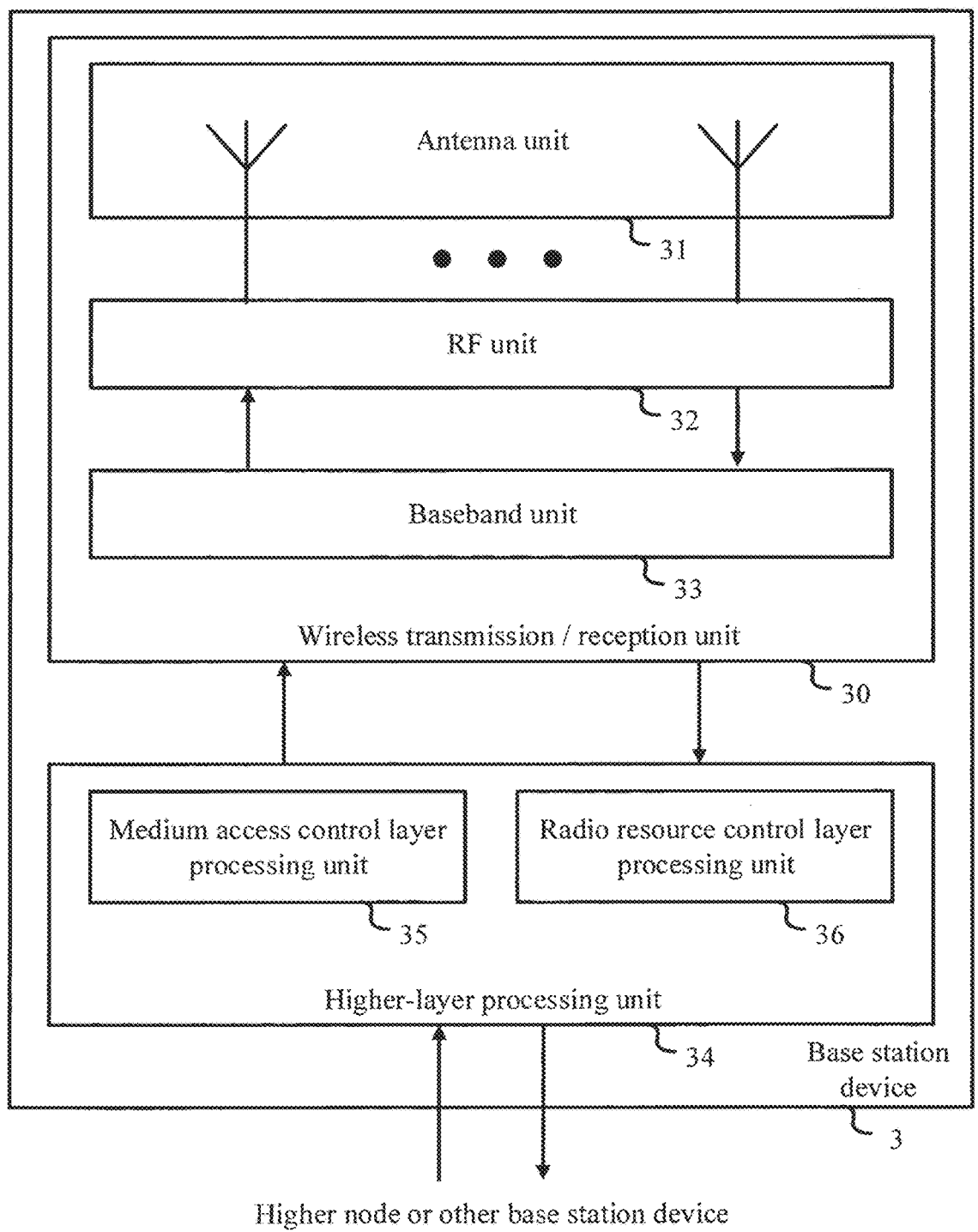
FIG. 5 is a schematic block diagram showing a configuration example of the base station device 3 according to an aspect of the present embodiment.

FIG. 5 is a schematic block diagram showing a configuration example of the base station device 3 according to an aspect of the present embodiment. As shown in FIG. 5, the base station device 3 includes at least a part or all of the wireless transmission/reception unit (physical layer processing unit) 30 and the higher-layer processing unit 34. The wireless transmission/reception unit 30 includes at least a part or all of the antenna unit 31, the RF unit 32 (Radio Frequency unit 32), and the baseband unit 33. The higher-layer processing unit 34 includes at least a part or all of the medium access control layer processing unit 35 and the radio resource control layer processing unit 36.

The wireless transmission/reception unit 30 includes at least a part or all of a wireless transmission unit 30a and a wireless reception unit 30b. The configuration of the baseband unit 33 included in the wireless transmission unit 30a and the configuration of the baseband unit 33 included in the wireless reception unit 30b may be the same or different. The configuration of the RF unit 32 included in the wireless transmission unit 30a and the configuration of the RF unit 32 included in the wireless reception unit 30b may be the same or different. The configuration of the antenna unit 31 included in the wireless transmission unit 30a and the configuration of the antenna unit 31 included in the wireless reception unit 30b may be the same or different.

The higher-layer processing unit 34 provides downlink data (a transport block) to the wireless transmission/reception unit 30 (or the wireless transmission unit 30a). The higher-layer processing unit 34 performs processing of a part or all of a medium access control layer (MAC layer), a packet data convergence protocol layer (PDCP layer), a radio link control layer (RLC layer) and/or a radio resource control layer (RRC layer).

The medium access control layer processing unit 35 included in the higher-layer processing unit 34 performs processing of the MAC layer.

The radio resource control layer processing unit 36 included in the higher-layer processing unit 34 performs the process of the RRC layer. The radio resource control layer processing unit 36 manages various configuration information/parameters (RRC parameters) of the terminal device 1. The radio resource control layer processing unit 36 may configure an RRC parameter based on the RRC message received from the terminal device 1.

The wireless transmission/reception unit 30 (or the wireless transmission unit 30a) performs processing such as encoding and modulation. The wireless transmission/reception unit 30 (or the wireless transmission unit 30a) generates a physical signal by encoding and modulating the downlink data. The wireless transmission/reception unit 30 (or the wireless transmission unit 30a) generates a time-continuous signal of the physical signal by IFFT (Inverse Fast Fourier Transformation) of OFDM symbols in the physical signal. The time-continuous-signal is also referred to as baseband signal. The wireless transmission/reception unit 30 (or the wireless transmission unit 30a) transmits the time-continuous signal to the terminal device 1 via radio frequency. The wireless transmission/reception unit 30 (or the wireless transmission unit 30a) may arrange the time-continuous signal on a component carrier and transmit the time-continuous signal to the terminal device 1.

For example, the baseband unit 33 generates the physical signal by encoding and modulating the downlink data. Then, the baseband unit 33 generates the time-continuous signal of the physical signal by IFFT of the OFDM symbols in the physical signal. Then, the RF unit 32 transmits the time-continuous signal to the terminal device 1 via radio frequency by using the antenna unit 31.

The wireless transmission/reception unit 30 (or the wireless reception unit 30b) may perform the channel access procedure prior to the transmission of the time-continuous signal of the physical channel.

The wireless transmission/reception unit 30 (or the wireless reception unit 30b) performs processing such as demodulation and decoding. The wireless transmission/reception unit 30 (or the wireless reception unit 30b) receives a time-continuous signal of a physical signal from the terminal device 1 via radio frequency. The wireless transmission/reception unit 30 (or the wireless reception unit 30b) extracts frequency domain component of the physical signal by Fast Fourier Transformation (FFT) of the time-continuous signal. The frequency domain component of the physical signal is also referred to as OFDM symbols of the physical signal. The wireless transmission/reception unit 30 (or the wireless reception unit 30b) extracts uplink data by demodulating and decoding the physical signal.

At least one or more serving cells (or one or more component carriers, one or more downlink component carriers, one or more uplink component carriers) may be configured for the terminal device 1.

Each of the serving cells set for the terminal device 1 may be any of PCell (Primary cell), PSCell (Primary SCG cell), and SCell (Secondary Cell).

A PCell is a serving cell included in a MCG (Master Cell Group). A PCell is a cell (implemented cell) which performs an initial connection establishment procedure or a connection re-establishment procedure by the terminal device 1.

A PSCell is a serving cell included in a SCG (Secondary Cell Group). A PSCell is a serving cell in which random-access is performed by the terminal device 1 in a reconfiguration procedure with synchronization (Reconfiguration with synchronization).

A SCell may be included in either a MCG or a SCG.

The serving cell group (cell group) is a designation including at least MCG and SCG. The serving cell group may include one or more serving cells (or one or more component carriers). One or more serving cells (or one or more component carriers) included in the serving cell group may be operated by carrier aggregation.

One or more downlink BWPs may be configured for each serving cell (or each downlink component carrier). One or more uplink BWPs may be configured for each serving cell (or each uplink component carrier).

Among the one or more downlink BWPs set for the serving cell (or the downlink component carrier), one downlink BWP may be set as an active downlink BWP (or one downlink BWP may be activated). Among the one or more uplink BWPs set for the serving cell (or the uplink component carrier), one uplink BWP may be set as an active uplink BWP (or one uplink BWP may be activated).

A PDSCH, a PDCCH, and a CSI-RS may be received in the active downlink BWP. The terminal device 1 may receive the PDSCH, the PDCCH, and the CSI-RS in the active downlink BWP. A PUCCH and a PUSCH may be sent on the active uplink BWP. The terminal device 1 may transmit the PUCCH and the PUSCH in the active uplink BWP. The active downlink BWP and the active uplink BWP are also referred to as active BWP.

The PDSCH, the PDCCH, and the CSI-RS may not be received in downlink BWPs (inactive downlink BWPs) other than the active downlink BWP. The terminal device 1 may not receive the PDSCH, the PDCCH, and the CSI-RS in the downlink BWPs which are other than the active downlink BWP. The PUCCH and the PUSCH do not need to be transmitted in uplink BWPs (inactive uplink BWPs) other than the active uplink BWP. The terminal device 1 may not transmit the PUCCH and the PUSCH in the uplink BWPs which is other than the active uplink BWP. The inactive downlink BWP and the inactive uplink BWP are also referred to as inactive BWP.

Downlink BWP switching deactivates an active downlink BWP and activates one of inactive downlink BWPs which are other than the active downlink BWP. The downlink BWP switching may be controlled by a BWP field included in a downlink control information. The downlink BWP switching may be controlled based on higher-layer parameters.

Uplink BWP switching is used to deactivate an active uplink BWP and activate any inactive uplink BWP which is other than the active uplink BWP. Uplink BWP switching may be controlled by a BWP field included in a downlink control information. The uplink BWP switching may be controlled based on higher-layer parameters.

Among the one or more downlink BWPs set for the serving cell, two or more downlink BWPs may not be set as active downlink BWPs. For the serving cell, one downlink BWP may be active at a certain time.

Among the one or more uplink BWPs set for the serving cell, two or more uplink BWPs may not be set as active uplink BWPs. For the serving cell, one uplink BWP may be active at a certain time.

Figure 6:
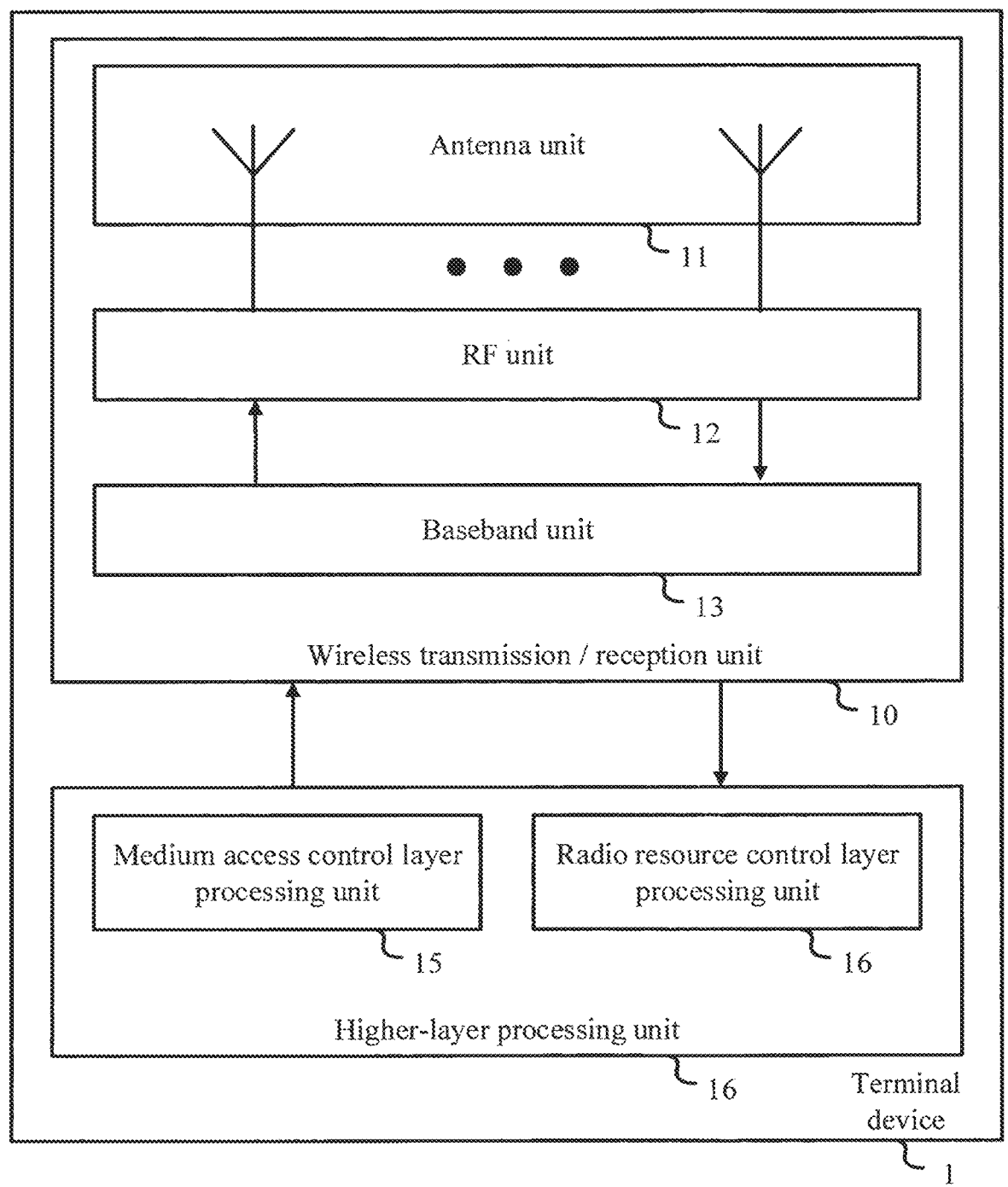
FIG. 6 is a schematic block diagram showing a configuration example of the terminal device 1 according to an aspect of the present embodiment.

FIG. 6 is a schematic block diagram showing a configuration example of the terminal device 1 according to an aspect of the present embodiment. As shown in FIG. 6, the terminal device 1 includes at least a part or all of the wireless transmission/reception unit (physical layer processing unit) 10 and the higher-layer processing unit 14. The wireless transmission/reception unit 10 includes at least a part or all of the antenna unit 11, the RF unit 12, and the baseband unit 13. The higher-layer processing unit 14 includes at least a part or all of the medium access control layer processing unit 15 and the radio resource control layer processing unit 16.

The wireless transmission/reception unit 10 includes at least a part of or all of a wireless transmission unit 10a and a wireless reception unit 10b. The configuration of the baseband unit 13 included in the wireless transmission unit 10a and the configuration of the baseband unit 13 included in the wireless reception unit 10b may be the same or different. The configuration of the RF unit 12 included in the wireless transmission unit 10a and the RF unit 12 included in the wireless reception unit 10b may be the same or different. The configuration of the antenna unit 11 included in the wireless transmission unit 10a and the configuration of the antenna unit 11 included in the wireless reception unit 10b may be the same or different.

The higher-layer processing unit 14 provides uplink data (a transport block) to the wireless transmission/reception unit 10 (or the wireless transmission unit 10a). The higher-layer processing unit 14 performs processing of a MAC layer, a packet data integration protocol layer, a radio link control layer, and/or an RRC layer.

The medium access control layer processing unit 15 included in the higher-layer processing unit 14 performs processing of the MAC layer.

The radio resource control layer processing unit 16 included in the higher-layer processing unit 14 performs the process of the RRC layer. The radio resource control layer processing unit 16 manages various configuration information/parameters (RRC parameters) of the terminal device 1. The radio resource control layer processing unit 16 configures RRC parameters based on the RRC message received from the base station device 3.

The wireless transmission/reception unit 10 (or the wireless transmission unit 10a) performs processing such as encoding and modulation. The wireless transmission/reception unit 10 (or the wireless transmission unit 10a) generates a physical signal by encoding and modulating the uplink data. The wireless transmission/reception unit 10 (or the wireless transmission unit 10a) generates a time-continuous signal of the physical signal by IFFT (Inverse Fast Fourier Transformation) of OFDM symbols in the physical signal. The time-continuous-signal is also referred to as baseband signal. The wireless transmission/reception unit 10 (or the wireless transmission unit 10a) transmits the time-continuous signal to the base station device 3 via radio frequency. The wireless transmission/reception unit 10 (or the wireless transmission unit 10a) may arrange the time-continuous signal on a BWP (an active uplink BWP) and transmit the time-continuous signal to the base station device 3.

For example, the baseband unit 13 generates the physical signal by encoding and modulating the downlink data. Then, the baseband unit 13 generates the time-continuous signal of the physical signal by IFFT of the OFDM symbols in the physical signal. Then, the RF unit 12 transmits the time-continuous signal to the base station device 3 via radio frequency by using the antenna unit 11.

The wireless transmission/reception unit 10 (or the wireless reception unit 10b) may perform the channel access procedure prior to the transmission of the time-continuous signal of the physical channel.

The wireless transmission/reception unit 10 (or the wireless transmission unit 10b) performs processing such as demodulation and decoding. The wireless transmission/reception unit 10 (or the wireless transmission unit 10b) receives a time-continuous signal of a physical signal from the base station device 3 via radio frequency. The wireless transmission/reception unit 10 (or the wireless transmission unit 10b) extracts frequency domain component of the physical signal by Fast Fourier Transformation (FFT) of the time-continuous signal. The frequency domain component of the physical signal is also referred to as OFDM symbols of the physical signal. The wireless transmission/reception unit 10 (or the wireless transmission unit 10b) extracts uplink data by demodulating and decoding the physical signal.

Hereinafter, physical signals (signals) will be described.

Physical signal is a generic term for downlink physical channels, downlink physical signals, uplink physical channels, and uplink physical channels. The physical channel is a generic term for downlink physical channels and uplink physical channels.

An uplink physical channel may correspond to a set of resource elements that carry information originating from the higher-layer and/or uplink control information. The uplink physical channel may be a physical channel used in an uplink component carrier. The uplink physical channel may be transmitted by the terminal device 1. The uplink physical channel may be received by the base station device 3. In the wireless communication system according to one aspect of the present embodiment, at least part or all of PUCCH (Physical Uplink Control CHannel), PUSCH (Physical Uplink Shared CHannel), and PRACH (Physical Random Access CHannel) may be used.

A PUCCH may be used to transmit uplink control information (UCI: Uplink Control Information). The PUCCH may be sent to deliver (transmission, convey) uplink control information. The uplink control information may be mapped to (or arranged in) the PUCCH. The terminal device 1 may transmit PUCCH in which uplink control information is arranged. The base station device 3 may receive the PUCCH in which the uplink control information is arranged.

Uplink control information (uplink control information bit, uplink control information sequence, uplink control information type) includes at least part or all of channel state information (CSI: Channel State Information), scheduling request (SR: Scheduling Request), and HARQ-ACK (Hybrid Automatic Repeat request ACKnowledgement).

Channel state information is conveyed by using channel state information bits or a channel state information sequence. Scheduling request is also referred to as a scheduling request bit or a scheduling request sequence. HARQ-ACK information is also referred to as a HARQ-ACK information bit or a HARQ-ACK information sequence.

HARQ-ACK information may include HARQ-ACK status which corresponds to a transport block (TB: Transport block, MAC PDU: Medium Access Control Protocol Data Unit, DL-SCH: Downlink-Shared Channel, UL-SCH: Uplink-Shared Channel, PDSCH: Physical Downlink Shared CHannel, PUSCH: Physical Uplink Shared CHannel). The HARQ-ACK status may indicate ACK (acknowledgement) or NACK (negative-acknowledgement) corresponding to the transport block. The ACK may indicate that the transport block has been successfully decoded. The NACK may indicate that the transport block has not been successfully decoded. The HARQ-ACK information may include a HARQ-ACK codebook that includes one or more HARQ-ACK status (or HARQ-ACK bits).

For example, the correspondence between the HARQ-ACK information and the transport block may mean that the HARQ-ACK information and the PDSCH used for transmission of the transport block correspond.

HARQ-ACK status may indicate ACK or NACK which correspond to one CBG (Code Block Group) included in the transport block.

The scheduling request may at least be used to request PUSCH (or UL-SCH) resources for new transmission. The scheduling request may be used to indicate either a positive SR or a negative SR. The fact that the scheduling request indicates a positive SR is also referred to as "a positive SR is sent". The positive SR may indicate that the PUSCH (or UL-SCH) resource for initial transmission is requested by the terminal device 1. A positive SR may indicate that a higher-layer is to trigger a scheduling request. The positive SR may be sent when the higher-layer instructs to send a scheduling request. The fact that the scheduling request bit indicates a negative SR is also referred to as "a negative SR is sent". A negative SR may indicate that the PUSCH (or UL-SCH) resource for initial transmission is not requested by the terminal device 1. A negative SR may indicate that the higher-layer does not trigger a scheduling request. A negative SR may be sent if the higher-layer is not instructed to send a scheduling request.

The channel state information may include at least part or all of a channel quality indicator (CQI), a precoder matrix indicator (PMI), and a rank indicator (RI). CQI is an indicator related to channel quality (e.g., propagation quality) or physical channel quality, and PMI is an indicator related to a precoder. RI is an indicator related to transmission rank (or the number of transmission layers).

Channel state information may be provided at least based on receiving one or more physical signals (e.g., one or more CSI-RSs) used at least for channel measurement. The channel state information may be selected by the terminal device 1 at least based on receiving one or more physical signals used for channel measurement. Channel measurements may include interference measurements.

A PUCCH may correspond to a PUCCH format. A PUCCH may be a set of resource elements used to convey a PUCCH format. A PUCCH may include a PUCCH format. A PUCCH format may include UCI.

A PUSCH may be used to transmit uplink data (a transport block) and/or uplink control information. A PUSCH may be used to transmit uplink data (a transport block) corresponding to a UL-SCH and/or uplink control information. A PUSCH may be used to convey uplink data (a transport block) and/or uplink control information. A PUSCH may be used to convey uplink data (a transport block) corresponding to a UL-SCH and/or uplink control information. Uplink data (a transport block) may be arranged in a PUSCH. Uplink data (a transport block) corresponding to UL-SCH may be arranged in a PUSCH. Uplink control information may be arranged to a PUSCH. The terminal device 1 may transmit a PUSCH in which uplink data (a transport block) and/or uplink control information is arranged. The base station device 3 may receive a PUSCH in which uplink data (a transport block) and/or uplink control information is arranged.

A PRACH may be used to transmit a random-access preamble. The PRACH may be used to convey a random-access preamble. The sequence $x_{u,v}(n)$ of the PRACH is defined by $x_{u,v}(n) = x_u (\mod (n+C_v, L_{RA}))$. The $x_u$ may be a ZC sequence (Zadoff-Chu sequence). The $x_u$ may be defined by $x_u = \exp(-jpui(i+1)/L_{RA})$. The j is an imaginary unit. The p is the circle ratio. The $C_v$ corresponds to cyclic shift of the PRACH. $L_{RA}$ corresponds to the length of the PRACH. The $L_{RA}$ may be 839 or 139 or another value. The i is an integer in the range of 0 to $L_{RA}-1$. The u is a sequence index for the PRACH. The terminal device 1 may transmit the PRACH. The base station device 3 may receive the PRACH.

For a given PRACH opportunity, 64 random-access preambles are defined. The random-access preamble is specified (determined, given) at least based on the cyclic shift $C_v$ of the PRACH and the sequence index u for the PRACH.

An uplink physical signal may correspond to a set of resource elements. The uplink physical signal may not carry information generated in the higher-layer. The uplink physical signal may be a physical signal used in the uplink component carrier. The terminal device 1 may transmit an uplink physical signal. The base station device 3 may receive the uplink physical signal. In the radio communication system according to one aspect of the present embodiment, at least a part or all of UL DMRS (UpLink Demodulation Reference Signal), SRS (Sounding Reference Signal), UL PTRS (UpLink Phase Tracking Reference Signal) may be used.

UL DMRS is a generic name of a DMRS for a PUSCH and a DMRS for a PUCCH.

A set of antenna ports of a DMRS for a PUSCH (a DMRS associated with a PUSCH, a DMRS included in a PUSCH, a DMRS which corresponds to a PUSCH) may be given based on a set of antenna ports for the PUSCH. That is, the set of DMRS antenna ports for the PUSCH may be the same as the set of antenna ports for the PUSCH.

Transmission of a PUSCH and transmission of a DMRS for the PUSCH may be indicated (or scheduled) by one DCI format. The PUSCH and the DMRS for the PUSCH may be collectively referred to as a PUSCH. Transmission of the PUSCH may be transmission of the PUSCH and the DMRS for the PUSCH.

A PUSCH may be estimated from a DMRS for the PUSCH. That is, propagation path of the PUSCH may be estimated from the DMRS for the PUSCH.

A set of antenna ports of a DMRS for a PUCCH (a DMRS associated with a PUCCH, a DMRS included in a PUCCH, a DMRS which corresponds to a PUCCH) may be identical to a set of antenna ports for the PUCCH.

Transmission of a PUCCH and transmission of a DMRS for the PUCCH may be indicated (or triggered) by one DCI format. The arrangement of the PUCCH in resource elements (resource element mapping) and/or the arrangement of the DMRS in resource elements for the PUCCH may be provided at least by one PUCCH format. The PUCCH and the DMRS for the PUCCH may be collectively referred to as PUCCH. Transmission of the PUCCH may be transmission of the PUCCH and the DMRS for the PUCCH.

A PUCCH may be estimated from a DMRS for the PUCCH. That is, propagation path of the PUCCH may be estimated from the DMRS for the PUCCH.

A downlink physical channel may correspond to a set of resource elements that carry information originating from the higher-layer and/or downlink control information. The downlink physical channel may be a physical channel used in the downlink component carrier. The base station device 3 may transmit the downlink physical channel. The terminal device 1 may receive the downlink physical channel. In the wireless communication system according to one aspect of the present embodiment, at least a part or all of PBCH (Physical Broadcast Channel), PDCCH (Physical Downlink Control Channel), and PDSCH (Physical Downlink Shared Channel) may be used.

The PBCH may be used to transmit a MIB (Master Information Block) and/or physical layer control information. The physical layer control information is a kind of downlink control information. The PBCH may be sent to deliver the MIB and/or the physical layer control information. A BCH may be mapped (or corresponding) to the PBCH. The terminal device 1 may receive the PBCH. The base station device 3 may transmit the PBCH. The physical layer control information is also referred to as a PBCH payload and a PBCH payload related to timing. The MIB may include one or more higher-layer parameters.

Physical layer control information includes 8 bits. The physical layer control information may include at least part or all of 0A to 0D. The 0A is radio frame information. The 0B is half radio frame information (half system frame information). The 0C is SS/PBCH block index information. The 0D is subcarrier offset information.

The radio frame information is used to indicate a radio frame in which the PBCH is transmitted (a radio frame including a slot in which the PBCH is transmitted). The radio frame information is represented by 4 bits. The radio frame information may be represented by 4 bits of a radio frame indicator. The radio frame indicator may include 10 bits. For example, the radio frame indicator may at least be used to identify a radio frame from index 0 to index 1023.

The half radio frame information is used to indicate whether the PBCH is transmitted in first five subframes or in second five subframes among radio frames in which the PBCH is transmitted. Here, the half radio frame may be configured to include five subframes. The half radio frame may be configured by five subframes of the first half of ten subframes included in the radio frame. The half radio frame may be configured by five subframes in the second half of ten subframes included in the radio frame.

The SS/PBCH block index information is used to indicate an SS/PBCH block index. The SS/PBCH block index information may be represented by 3 bits. The SS/PBCH block index information may consist of 3 bits of an SS/PBCH block index indicator. The SS/PBCH block index indicator may include 6 bits. The SS/PBCH block index indicator may at least be used to identify an SS/PBCH block from index 0 to index 63 (or from index 0 to index 3, from index 0 to index 7, from index 0 to index 9, from index 0 to index 19, etc.).

The subcarrier offset information is used to indicate subcarrier offset. The subcarrier offset information may be used to indicate the difference between the first subcarrier in which the PBCH is arranged and the first subcarrier in which the control resource set with index 0 is arranged.

A PDCCH may be used to transmit downlink control information (DCI). A PDCCH may be transmitted to deliver downlink control information. Downlink control information may be mapped to a PDCCH. The terminal device 1 may receive a PDCCH in which downlink control information is arranged. The base station device 3 may transmit the PDCCH in which the downlink control information is arranged.

Downlink control information may correspond to a DCI format. Downlink control information may be included in a DCI format. Downlink control information may be arranged in each field of a DCI format.

DCI format is a generic name for DCI format 0_0, DCI format 0_1, DCI format 1_0, and DCI format 1_1. Uplink DCI format is a generic name of the DCI format 0_0 and the DCI format 0_1. Downlink DCI format is a generic name of the DCI format 1_0 and the DCI format 1_1.

The DCI format 0_0 is at least used for scheduling a PUSCH for a cell (or a PUSCH arranged on a cell). The DCI format 0_0 includes at least a part or all of fields 1A to 1E. The 1A is a DCI format identification field (Identifier field for DCI formats). The 1B is a frequency domain resource assignment field (FDRA field). The 1C is a time domain resource assignment field (TDRA field). The 1D is a frequency-hopping flag field. The 1E is an MCS field (Modulation-and-Coding-Scheme field).

The DCI format identification field may indicate whether the DCI format including the DCI format identification field is an uplink DCI format or a downlink DCI format. The DCI format identification field included in the DCI format 0_0 may indicate 0 (or may indicate that the DCI format 0_0 is an uplink DCI format).

The frequency domain resource assignment field included in the DCI format 0_0 may be at least used to indicate the assignment (allocation) of frequency resources for a PUSCH. The frequency domain resource assignment field included in the DCI format 0_0 may be at least used to indicate the assignment (allocation) of frequency resources for a PUSCH scheduled by the DCI format 0_0.

A frequency domain resource assignment field in any DCI format includes frequency domain resource assignment information. The frequency domain resource assignment information may indicate type of resource assignment. the type may at least include a part or both of resource assignment type-0, and resource assignment type-1. If the frequency domain resource assignment information indicates the type of the resource assignment, the frequency domain resource assignment information includes resource assignment type information and resource block assignment information. The resource assignment type information indicates the type of the resource assignment. The resource block assignment information indicates a set of resource blocks in frequency domain for a physical channel scheduled by the any DCI format.

The time domain resource assignment field included in the DCI format 0_0 may be at least used to indicate the assignment of time resources for a PUSCH. The time domain resource assignment field included in the DCI format 0_0 may be at least used to indicate the assignment of time resources for a PUSCH scheduled by the DCI format 0_0.

The frequency-hopping flag field may be at least used to indicate whether frequency-hopping is applied to a PUSCH. The frequency-hopping flag field may be at least used to indicate whether frequency-hopping is applied to a PUSCH scheduled by the DCI format 0_0.

The MCS field included in the DCI format 0_0 may be at least used to indicate a modulation scheme for a PUSCH and/or a part or all of a target coding rate for the PUSCH. The MCS field included in the DCI format 0_0 may be at least used to indicate a modulation scheme for a PUSCH scheduled by the DCI format 0_0 and/or a part or all of a target coding rate for the PUSCH. A size of a transport block (TBS: Transport Block Size) of a PUSCH may be given based at least on a target coding rate and a part or all of a modulation scheme for the PUSCH.

The DCI format 0_0 may not include fields used for a CSI request. That is, CSI may not be requested by the DCI format 00.

The DCI format 0_0 may not include a carrier indicator field. An uplink component carrier on which a PUSCH scheduled by the DCI format 0_0 is arranged may be the same as an uplink component carrier on which a PDCCH including the DCI format 0_0 is arranged.

The DCI format 0_0 may not include a BWP field. An uplink BWP on which a PUSCH scheduled by the DCI format 0_0 is arranged may be the same as an uplink BWP on which a PDCCH including the DCI format 0_0 is arranged.

The DCI format 0_1 is at least used for scheduling of a PUSCH for a cell (or arranged on a cell). The DCI format 0_1 includes at least a part or all of fields 2A to 2H. The 2A is a DCI format identification field. The 2B is a frequency domain resource assignment field. The 2C is a time domain resource assignment field. The 2D is a frequency-hopping flag field. The 2E is an MCS field. The 2F is a CSI request field. The 2G is a BWP field. The 2H is a carrier indicator field.

The DCI format identification field included in the DCI format 0_1 may indicate 0 (or may indicate that the DCI format 0_1 is an uplink DCI format).

The frequency domain resource assignment field included in the DCI format 0_1 may be at least used to indicate the assignment of frequency resources for a PUSCH. The frequency domain resource assignment field included in the DCI format 0_1 may be at least used to indicate the assignment of frequency resources for a PUSCH scheduled by the DCI format.

The time domain resource assignment field included in the DCI format 0_1 may be at least used to indicate the assignment of time resources for a PUSCH. The time domain resource assignment field included in DCI format 0_1 may be at least used to indicate the assignment of time resources for a PUSCH scheduled by the DCI format 0_1.

The frequency-hopping flag field may be at least used to indicate whether frequency-hopping is applied to a PUSCH scheduled by the DCI format 0_1.

The MCS field included in the DCI format 0_1 may be at least used to indicate a modulation scheme for a PUSCH and/or a part or all of a target coding rate for the PUSCH. The MCS field included in the DCI format 0_1 may be at least used to indicate a modulation scheme for a PUSCH scheduled by the DCI format and/or part or all of a target coding rate for the PUSCH.

When the DCI format 0_1 includes the BWP field, the BWP field may be used to indicate an uplink BWP on which a PUSCH scheduled by the DCI format 0_1 is arranged. When the DCI format 0_1 does not include the BWP field, an uplink BWP on which a PUSCH is arranged may be the active uplink BWP. When a number of uplink BWPs configured in the terminal device 1 in an uplink component carrier is two or more, a number of bits for the BWP field included in the DCI format 0_1 used for scheduling a PUSCH arranged on the uplink component carrier may be one or more. When a number of uplink BWPs configured in the terminal device 1 in an uplink component carrier is one, a number of bits for the BWP field included in the DCI format 0_1 used for scheduling a PUSCH arranged on the uplink component carrier may be zero.

The CSI request field is at least used to indicate CSI reporting.

If the DCI format 0_1 includes the carrier indicator field, the carrier indicator field may be used to indicate an uplink component carrier (or a serving cell) on which a PUSCH is arranged. When the DCI format 0_1 does not include the carrier indicator field, a serving cell on which a PUSCH is arranged may be the same as the serving cell on which a PDCCH including the DCI format 0_1 used for scheduling of the PUSCH is arranged. When a number of uplink component carriers (or a number of serving cells) configured in the terminal device 1 in a serving cell group is two or more (when uplink carrier aggregation is operated in a serving cell group), or when cross-carrier scheduling is configured for the serving cell group, a number of bits for the carrier indicator field included in the DCI format 0_1 used for scheduling a PUSCH arranged on the serving cell group may be one or more (e.g., 3). When a number of uplink component carriers (or a number of serving cells) configured in the terminal device 1 in a serving cell group is one (or when uplink carrier aggregation is not operated in a serving cell group), or when the cross-carrier scheduling is not configured for the serving cell group, a number of bits for the carrier indicator field included in the DCI format 0_1 used for scheduling of a PUSCH arranged on the serving cell group may be zero.

The DCI format 1_0 is at least used for scheduling of a PDSCH for a cell (arranged on a cell). The DCI format 1_0 includes at least a part or all of fields 3A to 3F. The 3A is a DCI format identification field. The 3B is a frequency domain resource assignment field. The 3C is a time domain resource assignment field. The 3D is an MCS field. The 3E is a PDSCH-to-HARQ-feedback indicator field. The 3F is a PUCCH resource indicator field.

The DCI format identification field included in the DCI format 1_0 may indicate 1 (or may indicate that the DCI format 1_0 is a downlink DCI format).

The frequency domain resource assignment field included in the DCI format 1_0 may be at least used to indicate the assignment of frequency resources for a PDSCH. The frequency domain resource assignment field included in the DCI format 1_0 may be at least used to indicate the assignment of frequency resources for a PDSCH scheduled by the DCI format 1_0.

The time domain resource assignment field included in the DCI format 1_0 may be at least used to indicate the assignment of time resources for a PDSCH. The time domain resource assignment field included in the DCI format 1_0 may be at least used to indicate the assignment of time resources for a PDSCH scheduled by the DCI format 1_0.

The MCS field included in the DCI format 1_0 may be at least used to indicate a modulation scheme for a PDSCH and/or a part or all of a target coding rate for the PDSCH. The MCS field included in the DCI format 1_0 may be at least used to indicate a modulation scheme for a PDSCH scheduled by the DCI format 1_0 and/or a part or all of a target coding rate for the PDSCH. A size of a transport block (TBS: Transport Block Size) of a PDSCH may be given based at least on a target coding rate and a part or all of a modulation scheme for the PDSCH.

The PDSCH-to-HARQ-feedback timing indicator field may be at least used to indicate the offset from a slot in which the last OFDM symbol of a PDSCH scheduled by the DCI format 10 is included to another slot in which the first OFDM symbol of a PUCCH triggered by the DCI format 1_0 is included.

The PUCCH resource indicator field may be a field indicating an index of any one or more PUCCH resources included in the PUCCH resource set for a PUCCH transmission. The PUCCH resource set may include one or more PUCCH resources. The PUCCH resource indicator field may trigger PUCCH transmission with a PUCCH resource indicated at least based on the PUCCH resource indicator field.

The DCI format 1_0 may not include the carrier indicator field. A downlink component carrier on which a PDSCH scheduled by the DCI format 1_0 is arranged may be the same as a downlink component carrier on which a PDCCH including the DCI format 1_0 is arranged.

The DCI format 1_0 may not include the BWP field. A downlink BWP on which a PDSCH scheduled by a DCI format 1_0 is arranged may be the same as a downlink BWP on which a PDCCH including the DCI format 1_0 is arranged.

The DCI format 1_i is at least used for scheduling of a PDSCH for a cell (or arranged on a cell). The DCI format 1_1 includes at least a part or all of fields 4A to 4H. The 4A is a DCI format identification field. The 4B is a frequency domain resource assignment field. The 4C is a time domain resource assignment field. The 4D is an MCS field. The 4E is a PDSCH-to-HARQ-feedback indicator field. The 4F is a PUCCH resource indicator field. The 4G is a BWP field. The 4H is a carrier indicator field.

The DCI format identification field included in the DCI format 1_1 may indicate 1 (or may indicate that the DCI format 1_1 is a downlink DCI format).

The frequency domain resource assignment field included in the DCI format 1_1 may be at least used to indicate the assignment of frequency resources for a PDSCH. The frequency domain resource assignment field included in the DCI format 1_0 may be at least used to indicate the assignment of frequency resources for a PDSCH scheduled by the DCI format 11.

The time domain resource assignment field included in the DCI format 1_1 may be at least used to indicate the assignment of time resources for a PDSCH. The time domain resource assignment field included in the DCI format 1_1 may be at least used to indicate the assignment of time resources for a PDSCH scheduled by the DCI format 1_1.

The MCS field included in the DCI format 1_1 may be at least used to indicate a modulation scheme for a PDSCH and/or a part or all of a target coding rate for the PDSCH. The MCS field included in the DCI format 1_1 may be at least used to indicate a modulation scheme for a PDSCH scheduled by the DCI format 1_1 and/or a part or all of a target coding rate for the PDSCH.

When the DCI format 1_1 includes a PDSCH-to-HARQ-feedback timing indicator field, the PDSCH-to-HARQ-feedback timing indicator field indicates an offset from a slot including the last OFDM symbol of a PDSCH scheduled by the DCI format 1_1 to another slot including the first OFDM symbol of a PUCCH triggered by the DCI format 11. When the DCI format 11 does not include the PDSCH-to-HARQ-feedback timing indicator field, an offset from a slot in which the last OFDM symbol of a PDSCH scheduled by the DCI format 1_1 is included to another slot in which the first OFDM symbol of a PUCCH triggered by the DCI format 1_1 is identified by a higher-layer parameter.

When the DCI format 1_1 includes the BWP field, the BWP field may be used to indicate a downlink BWP on which a PDSCH scheduled by the DCI format 1_1 is arranged. When the DCI format 1_1 does not include the BWP field, a downlink BWP on which a PDSCH is arranged may be the active downlink BWP. When a number of downlink BWPs configured in the terminal device 1 in a downlink component carrier is two or more, a number of bits for the BWP field included in the DCI format 1_1 used for scheduling a PDSCH arranged on the downlink component carrier may be one or more. When a number of downlink BWPs configured in the terminal device 1 in a downlink component carrier is one, a number of bits for the BWP field included in the DCI format 1_1 used for scheduling a PDSCH arranged on the downlink component carrier may be zero.

If the DCI format 1_1 includes the carrier indicator field, the carrier indicator field may be used to indicate a downlink component carrier (or a serving cell) on which a PDSCH is arranged. When the DCI format 1_1 does not include the carrier indicator field, a downlink component carrier (or a serving cell) on which a PDSCH is arranged may be the same as a downlink component carrier (or a serving cell) on which a PDCCH including the DCI format 1_1 used for scheduling of the PDSCH is arranged. When a number of downlink component carriers (or a number of serving cells) configured in the terminal device 1 in a serving cell group is two or more (when downlink carrier aggregation is operated in a serving cell group), or when cross-carrier scheduling is configured for the serving cell group, a number of bits for the carrier indicator field included in the DCI format 1_1 used for scheduling a PDSCH arranged on the serving cell group may be one or more (e.g., 3). When a number of downlink component carriers (or a number of serving cells) configured in the terminal device 1 in a serving cell group is one (or when downlink carrier aggregation is not operated in a serving cell group), or when the cross-carrier scheduling is not configured for the serving cell group, a number of bits for the carrier indicator field included in the DCI format 1_1 used for scheduling of a PDSCH arranged on the serving cell group may be zero.

A PDSCH may be used to transmit one or more transport blocks. A PDSCH may be used to transmit one or more transport blocks which corresponds to a DL-SCH. A PDSCH may be used to convey one or more transport blocks. A PDSCH may be used to convey one or more transport blocks which corresponds to a DL-SCH. One or more transport blocks may be arranged in a PDSCH. One or more transport blocks which corresponds to a DL-SCH may be arranged in a PDSCH. The base station device 3 may transmit a PDSCH. The terminal device 1 may receive the PDSCH.

Downlink physical signals may correspond to a set of resource elements. The downlink physical signals may not carry the information generated in the higher-layer. The downlink physical signals may be physical signals used in the downlink component carrier. A downlink physical signal may be transmitted by the base station device 3. The downlink physical signal may be transmitted by the terminal device 1. In the wireless communication system according to one aspect of the present embodiment, at least a part or all of an SS (Synchronization signal), DL DMRS (DownLink DeModulation Reference Signal), CSI-RS (Channel State Information-Reference Signal), and DL PTRS (DownLink Phase Tracking Reference Signal) may be used.

The synchronization signal may be used at least for the terminal device 1 to synchronize in the frequency domain and/or time domain for downlink. The synchronization signal is a generic name of PSS (Primary Synchronization Signal) and SSS (Secondary Synchronization Signal).

Figure 7:
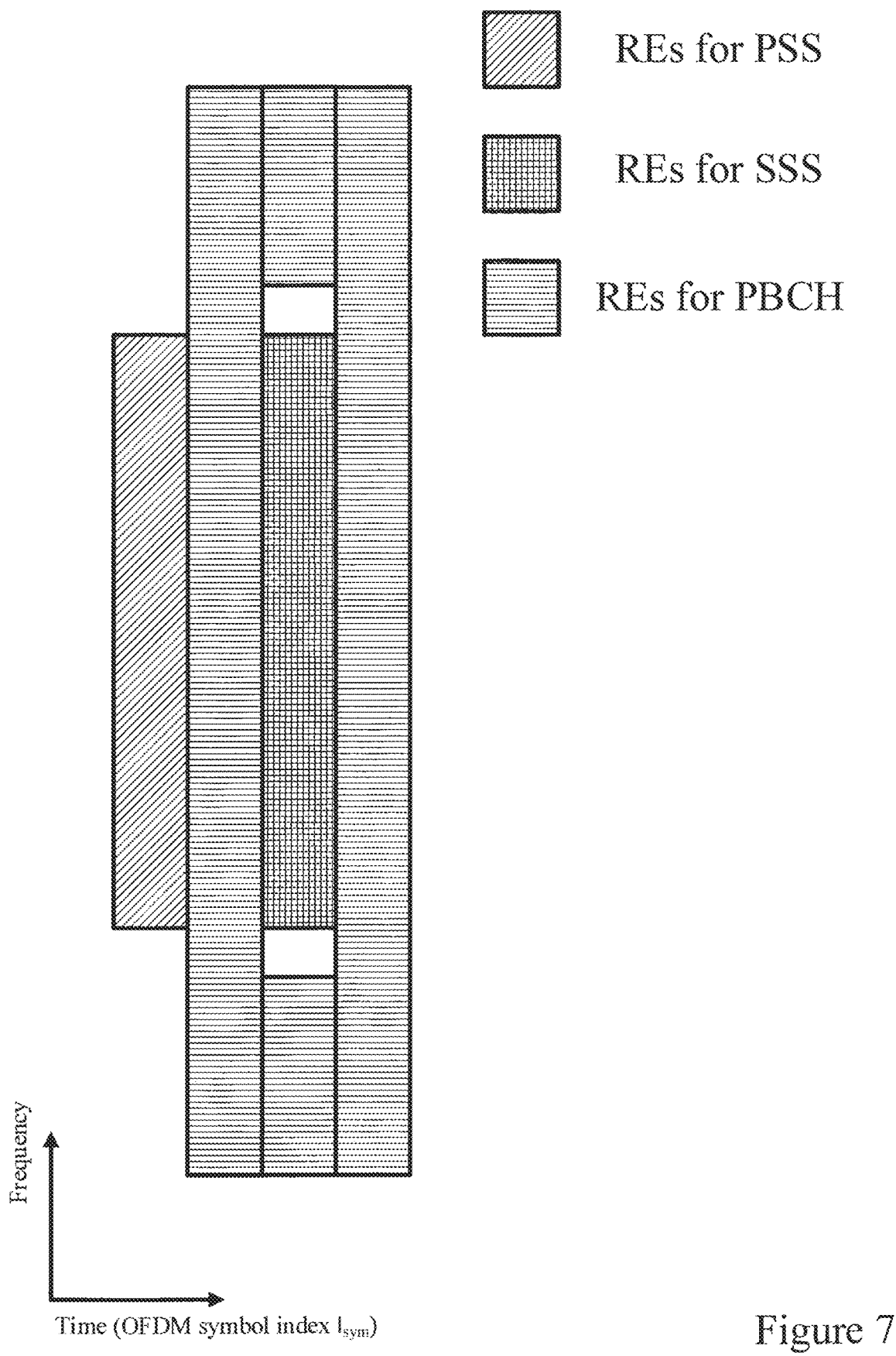
FIG. 7 is a diagram showing a configuration example of an SS/PBCH block according to an aspect of the present embodiment.

FIG. 7 is a diagram showing a configuration example of an SS/PBCH block according to an aspect of the present embodiment. In FIG. 7, the horizontal axis indicates time domain (OFDM symbol index $1_{sym}$), and the vertical axis indicates frequency domain. The shaded blocks indicate a set of resource elements for a PSS. The blocks of grid lines indicate a set of resource elements for an SSS. Also, the blocks in the horizontal line indicate a set of resource elements for a PBCH and a set of resource elements for a DMRS for the PBCH (DMRS related to the PBCH, DMRS included in the PBCH, DMRS which corresponds to the PBCH).

As shown in FIG. 7, the SS/PBCH block includes a PSS, an SSS, and a PBCH. The SS/PBCH block includes 4 consecutive OFDM symbols. The SS/PBCH block includes 240 subcarriers. The PSS is allocated to the 57th to 183rd subcarriers in the first OFDM symbol. The SSS is allocated to the 57th to 183rd subcarriers in the third OFDM symbol. The first to 56th subcarriers of the first OFDM symbol may be set to zero. The 184th to 240th subcarriers of the first OFDM symbol may be set to zero. The 49th to 56th subcarriers of the third OFDM symbol may be set to zero. The 184th to 192nd subcarriers of the third OFDM symbol may be set to zero. In the first to 240th subcarriers of the second OFDM symbol, the PBCH is allocated to subcarriers in which the DMRS for the PBCH is not allocated. In the first to 48th subcarriers of the third OFDM symbol, the PBCH is allocated to subcarriers in which the DMRS for the PBCH is not allocated. In the 193rd to 240th subcarriers of the third OFDM symbol, the PBCH is allocated to subcarriers in which the DMRS for the PBCH is not allocated. In the first to 240th subcarriers of the 4th OFDM symbol, the PBCH is allocated to subcarriers in which the DMRS for the PBCH is not allocated.

The antenna ports of a PSS, an SSS, a PBCH, and a DMRS for the PBCH in an SS/PBCH block may be identical.

A PBCH may be estimated from a DMRS for the PBCH. For the DM-RS for the PBCH, the channel over which a symbol for the PBCH on an antenna port is conveyed can be inferred from the channel over which another symbol for the DM-RS on the antenna port is conveyed only if the two symbols are within a SS/PBCH block transmitted within the same slot, and with the same SS/PBCH block index.

DL DMRS is a generic name of DMRS for a PBCH, DMRS for a PDSCH, and DMRS for a PDCCH.

A set of antenna ports for a DMRS for a PDSCH (a DMRS associated with a PDSCH, a DMRS included in a PDSCH, a DMRS which corresponds to a PDSCH) may be given based on the set of antenna ports for the PDSCH. The set of antenna ports for the DMRS for the PDSCH may be the same as the set of antenna ports for the PDSCH.

Transmission of a PDSCH and transmission of a DMRS for the PDSCH may be indicated (or scheduled) by one DCI format. The PDSCH and the DMRS for the PDSCH may be collectively referred to as PDSCH. Transmitting a PDSCH may be transmitting a PDSCH and a DMRS for the PDSCH.

A PDSCH may be estimated from a DMRS for the PDSCH. For a DM-RS associated with a PDSCH, the channel over which a symbol for the PDSCH on one antenna port is conveyed can be inferred from the channel over which another symbol for the DM-RS on the antenna port is conveyed only if the two symbols are within the same resource as the scheduled PDSCH, in the same slot, and in the same PRG (Precoding Resource Group).

Antenna ports for a DMRS for a PDCCH (a DMRS associated with a PDCCH, a DMRS included in a PDCCH, a DMRS which corresponds to a PDCCH) may be the same as an antenna port for the PDCCH.

A PDCCH may be estimated from a DMRS for the PDCCH. For a DM-RS associated with a PDCCH, the channel over which a symbol for the PDCCH on one antenna port is conveyed can be inferred from the channel over which another symbol for the DM-RS on the same antenna port is conveyed only if the two symbols are within resources for which the UE may assume the same precoding being used (i.e. within resources in a REG bundle).

A BCH (Broadcast CHannel), a UL-SCH (Uplink-Shared CHannel) and a DL-SCH (Downlink-Shared CHannel) are transport channels. A channel used in the MAC layer is called a transport channel. A unit of transport channel used in the MAC layer is also called transport block (TB) or MAC PDU (Protocol Data Unit). In the MAC layer, control of HARQ (Hybrid Automatic Repeat request) is performed for each transport block. The transport block is a unit of data delivered by the MAC layer to the physical layer. In the physical layer, transport blocks are mapped to codewords and modulation processing is performed for each codeword.

One UL-SCH and one DL-SCH may be provided for each serving cell. BCH may be given to PCell. BCH may not be given to PSCell and SCell.

A BCCH (Broadcast Control CHannel), a CCCH (Common Control CHannel), and a DCCH (Dedicated Control CHannel) are logical channels. The BCCH is a channel of the RRC layer used to deliver MIB or system information. The CCCH may be used to transmit a common RRC message in a plurality of terminal devices 1. The CCCH may be used for the terminal device 1 which is not connected by RRC. The DCCH may be used at least to transmit a dedicated RRC message to the terminal device 1. The DCCH may be used for the terminal device 1 that is in RRC-connected mode.

The RRC message includes one or more RRC parameters (information elements). For example, the RRC message may include a MIB. For example, the RRC message may include system information (SIB: System Information Block, MIB). SIB is a generic name for various type of SIBS (e.g., SIB1, SIB2). For example, the RRC message may include a message which corresponds to a CCCH. For example, the RRC message may include a message which corresponds to a DCCH. RRC message is a general term for common RRC message and dedicated RRC message.

The BCCH in the logical channel may be mapped to the BCH or the DL-SCH in the transport channel. The CCCH in the logical channel may be mapped to the DL-SCH or the UL-SCH in the transport channel. The DCCH in the logical channel may be mapped to the DL-SCH or the UL-SCH in the transport channel.

The UL-SCH in the transport channel may be mapped to a PUSCH in the physical channel. The DL-SCH in the transport channel may be mapped to a PDSCH in the physical channel. The BCH in the transport channel may be mapped to a PBCH in the physical channel.

A higher-layer parameter is a parameter included in an RRC message or a MAC CE (Medium Access Control Control Element). The higher-layer parameter is a generic name of information included in a MIB, system information, a message which corresponds to CCCH, a message which corresponds to DCCH, and a MAC CE.

The procedure performed by the terminal device 1 includes at least a part or all of the following 5A to 5C. The 5A is cell search. The 5B is random-access. The 5C is data communication.

The cell search is a procedure used by the terminal device 1 to synchronize with a cell in the time domain and/or the frequency domain and to detect a physical cell identity. The terminal device 1 may detect the physical cell ID by performing synchronization of time domain and/or frequency domain with a cell by the cell search.

A sequence of a PSS is given based at least on a physical cell ID. A sequence of an SSS is given based at least on the physical cell ID.

An SS/PBCH block candidate indicates a resource for which transmission of the SS/PBCH block may exist. An SS/PBCH block may be transmitted at a resource indicated as the SS/PBCH block candidate. The base station device 3 may transmit an SS/PBCH block at an SS/PBCH block candidate. The terminal device 1 may receive (detect) the SS/PBCH block at the SS/PBCH block candidate.

A set of SS/PBCH block candidates in a half radio frame is also referred to as an SS-burst-set. The SS-burst-set is also referred to as a transmission window, a SS transmission window, or a DRS transmission window (Discovery Reference Signal transmission window). The SS-burst-set is a generic name that includes at least a first SS-burst-set and a second SS-burst-set.

The base station device 3 transmits SS/PBCH blocks of one or more indexes at a predetermined cycle. The terminal device 1 may detect an SS/PBCH block of at least one of the SS/PBCH blocks of the one or more indexes. The terminal device 1 may attempt to decode the PBCH included in the SS/PBCH block.

The random-access is a procedure including at least a part or all of message 1, message 2, message 3, and message 4.

The message 1 is a procedure in which the terminal device 1 transmits a PRACH. The terminal device 1 transmits the PRACH in one PRACH occasion selected from among one or more PRACH occasions based on at least the index of the SS/PBCH block candidate detected based on the cell search.

PRACH occasion configuration may include at least part or all of a PRACH configuration period (PCF) TPCF, number of PRACH occasions $N^{PCF}_{RO,t}$ included in the time domain of a PRACH configuration period, the number of PRACH occasions included in the frequency domain $N_{RO,f}$, number $N^{RO}_{preamble}$ of random-access preambles per PRACH occasion allocated for random-access, number of preambles allocated per index of SS/PBCH block candidate for contention based random-access (CBRA), $N^{SSB}_{preamble}$, $_{CBRA}$, and number of PRACH occasions $N^{SSB}{}_{RO}$ allocated per index of SS/PBCH block candidate for contention based random-access.

At least based on the PRACH occasion configuration, at least part or all of time domain resources and frequency domain resources for a PRACH occasion.

An association between an index of an SS/PBCH block candidate that corresponds to an SS/PBCH block detected by the terminal device 1 and a PRACH occasion may be provided at least based on first bitmap information indicating one or more indexes of SS/PBCH block candidates used for transmission of actually-transmitted SS/PBCH blocks. The terminal device 1 may determine an association between the index of SS/PBCH block candidate including an SS/PBCH block detected by the terminal device 1 and PRACH occasions. For example, the first element of the first bitmap information may correspond to an SS/PBCH block candidate with index 0. For example, the second element of the first bitmap information may correspond to an SS/PBCH block candidate with index 1. For example, the $L_{SSB}$-1$^{th}$ element of the first bitmap information may correspond to an SS/PBCH block candidate with index $L_{SSB}$−1. The $L_{SSB}$ is number of SS/PBCH block candidates included in an SS-burst-set.

Figure 8:
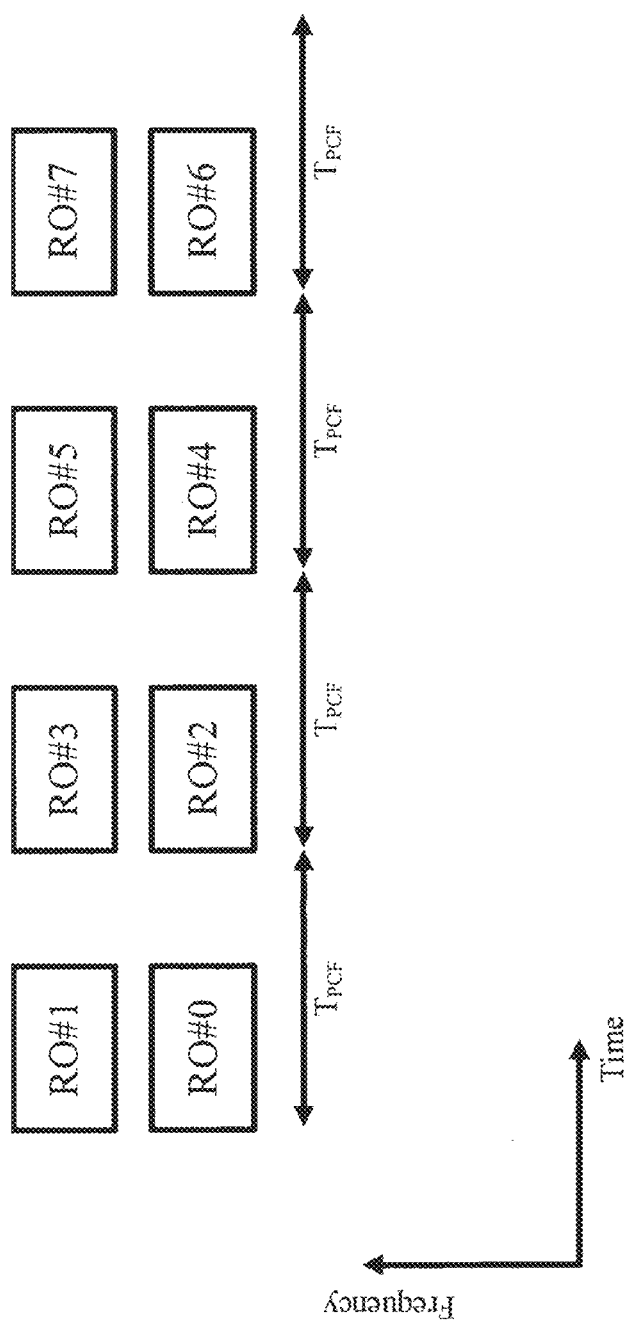
FIG. 8 is a diagram illustrating an example of setting of a PRACH resource according to an aspect of the present embodiment.

FIG. 8 is a diagram illustrating an example of setting of a PRACH resource according to an aspect of the present embodiment. In FIG. 8, the PRACH configuration period $T_{PCF}$ is 40 ms, the number of PRACH occasions included in the time domain of a PRACH configuration period $N^{PCF}{}_{RO, t}$ is 1, and the number of PRACH occasions included in the frequency domain $N_{RO, f}$ is 2.

For example, the first bitmap information (ssb-Position-InBurst) indicating the indexes of SS/PBCH block candidates used for transmission of SS/PBCH blocks is {1, 1, 0, 1, 0, 1, 0, 0}. The indexes of the SS/PBCH block candidates used for transmission of the SS/PBCH blocks is also called as actually transmitted SS/PBCH block or actually-transmitted SS/PBCH block candidate.

Figure 9:
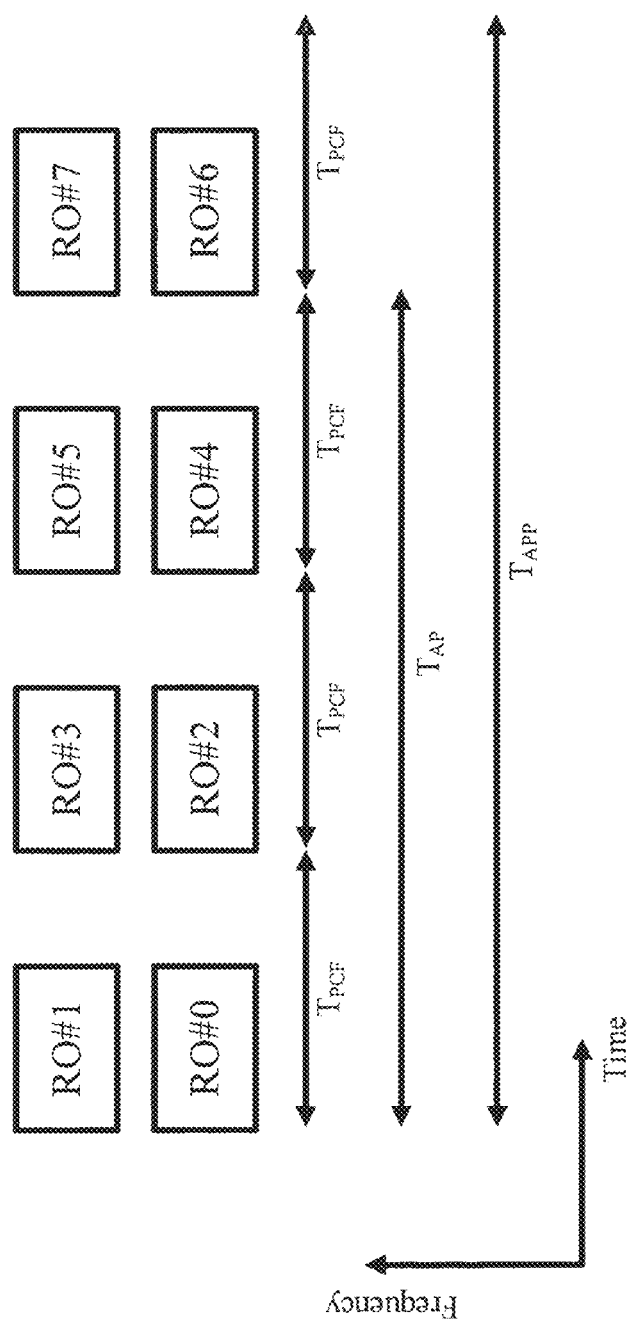
FIG. 9 is an example of an association between indexes of SS/PBCH block candidates and PRACH occasions (SS-RO association) in a case that $N^{RO}_{preamble}=64$, $N^{SSB}_{preamble,CBRA}=64$, $N^{SSB}_{RO}=1$, and the first bitmap is set to {1,1,0,1,0,1,1,0} according to an aspect of the embodiment.

FIG. 9 is an example of an association between indexes of SS/PBCH block candidates and PRACH occasions (SS-RO association) in a case that $N^{RO}{}_{preamble}$=64, $N^{SSB}{}_{preamble,CBRA}$=64, $N^{SSB}{}_{RO}$=1, and the first bitmap is set to {1,1,0,1,0,1,1,0} according to an aspect of the embodiment. In FIG. 9, it is assumed that PRACH occasion configuration is the same as in FIG. 8. In FIG. 9, the SS/PBCH block candidate with index 0 may correspond to the PRACH occasion (RO #0) with index 0, the SS/PBCH block candidate with index 1 may correspond to the PRACH occasion (RO #1) with index 1, and the SS/PBCH block candidate with index 3 may correspond to the PRACH occasion (RO #2) with index 2, the SS/PBCH block candidate with index 5 may correspond to the PRACH occasion (RO #3) with index 3, and the SS/PBCH block candidate with index 6 may correspond to the PRACH opportunity of index 4 (RO #4). In FIG. 9, a PRACH association period (PRACH AP) $T_{AP}$ is 120 ms including PRACH occasions from index 0 to index 4. In FIG. 9, PRACH association pattern period (PRACH APP) $T_{APP}$ is 160 ms. In FIG. 9, the PRACH association pattern period includes one PRACH association period.

Figure 10:
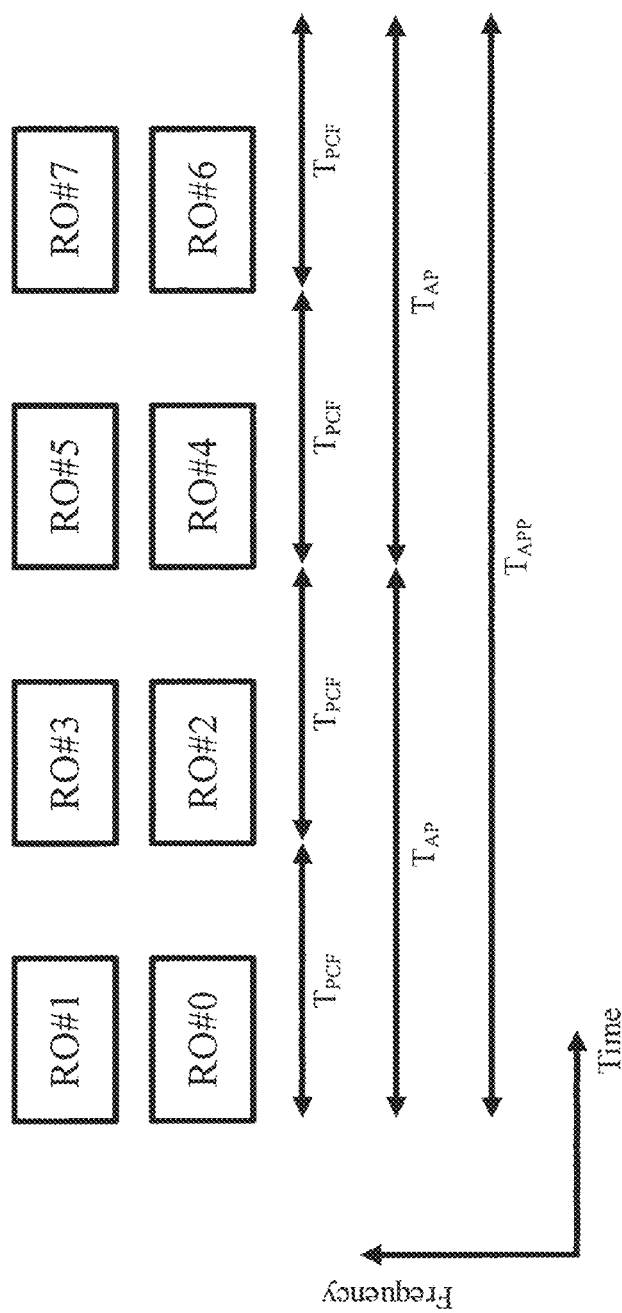
FIG. 10 is an example of an association between indexes of SS/PBCH block candidates and PRACH occasions (SS-RO association) in a case that $N^{RO}_{preamble}=64$, $N^{SSB}_{preamble,CBRA}=64$, $N^{SSB}_{RO}=1$, and the first bitmap is set to {1,1,0,1,0,1,0,0} according to an aspect of the embodiment.

FIG. 10 is an example of an association between indexes of SS/PBCH block candidates and PRACH occasions (SS-RO association) in a case that $N^{RO}{}_{preamble}$=64, $N^{SSB}{}_{preamble,CBRA}$=64, $N^{SSB}{}_{RO}$=1, and the first bitmap is set to {1,1,0,1,0,1,0,0} according to an aspect of the embodiment. In FIG. 10, it is assumed that PRACH occasion configuration is the same as in FIG. 8. In FIG. 10, the SS/PBCH block candidate with index 0 may correspond to the PRACH occasion (RO #0) with index 0 and the PRACH occasion (RO #4) with index 4, the SS/PBCH block candidate with index 1 may correspond to the PRACH occasion (RO #1) with index 1 and the PRACH occasion (RO #5) with index 5, the SS/PBCH block candidate with index 3 may correspond to the PRACH occasion (RO #2) with index 2 and the PRACH occasion (RO #6) with index 6, the SS/PBCH block candidate with index 5 may correspond to the PRACH occasion (RO #3) with index 3 and the PRACH occasion (RO #7) with index 7. In FIG. 10, a PRACH association period (PRACH AP) $T_{AP}$ is 80 ms including PRACH occasions from index 0 to index 3. In FIG. 9, PRACH association pattern period (PRACH APP) $T_{APP}$ is 160 ms. In FIG. 9, the PRACH association pattern period includes two PRACH association periods.

The smallest index of "the SS/PBCH block candidates actually used for transmission of SS/PBCH blocks" indicated by the first bitmap information may correspond to the first PRACH occasion (the PRACH occasion with index 0). The n-th index of "the SS/PBCH block candidates actually used for transmission of SS/PBCH blocks" indicated by the first bitmap information may correspond to the n-th PRACH occasion (the PRACH occasion with index n−1).

The index of the PRACH occasion is set to the PRACH occasions included in the PRACH association pattern period with priority given to the frequency axis (Frequency-first time-second).

In FIG. 9, PRACH occasions which corresponds to at least one actually-transmitted SS/PBCH block candidates are the PRACH occasion with index 0 to 4, and the PRACH configuration periods including at least one PRACH occasion which corresponds to at least one actually-transmitted SS/PBCH block candidates are first to third PRACH configuration periods. In FIG. 10, PRACH occasions which corresponds to at least one actually-transmitted SS/PBCH block candidates are the PRACH occasion with index 0 to 3, and the PRACH configuration periods including at least one PRACH occasion which corresponds to at least one actually-transmitted SS/PBCH block candidates are first to second PRACH configuration periods.

When the maximum integer k satisfying $T_{APP}$>k*$T_{AP}$ is 2 or more, one PRACH association pattern period is configured to include k PRACH association periods. In FIG. 10, since the largest integer k satisfying $T_{APP}$>k*$T_{AP}$ is 2, the first PRACH association period includes the two PRACH configuration periods from the beginning, and the second PRACH association period includes the third to fourth PRACH configuration periods.

The terminal device 1 may transmit a PRACH with a random-access preamble in a PRACH occasion selected from PRACH occasions which corresponds to the index of the detected SS/PBCH block candidate. The base station device 3 may receive the PRACH in the selected PRACH occasion.

The message 2 is a procedure in which the terminal device 1 attempts to detect a DCI format 1_0 with CRC (Cyclic Redundancy Check) scrambled by an RA-RNTI (Random Access-Radio Network Temporary Identifier). The terminal device 1 may attempt to detect the DCI format 1_0 in a search-space-set.

The message 3 is a procedure for transmitting a PUSCH scheduled by a random-access response grant included in the PDSCH (random-access response) scheduled by the DCI format 1_0 detected in the message 2 procedure. The random-access response grant is indicated by the MAC CE included in the PDSCH scheduled by the DCI format 1_0.

The PUSCH scheduled based on the random-access response grant is either a message 3 PUSCH or a PUSCH. The message 3 PUSCH contains a contention resolution identifier MAC CE. The contention resolution ID MAC CE includes a contention resolution ID.

Retransmission of the message 3 PUSCH is scheduled by DCI format 0_0 with CRC scrambled by a TC-RNTI (Temporary Cell-Radio Network Temporary Identifier).

The message 4 is a procedure that attempts to detect a DCI format 1_0 with CRC scrambled by either a C-RNTI (Cell-Radio Network Temporary Identifier) or a TC-RNTI. The terminal device 1 receives a PDSCH scheduled based on the DCI format 1_0. The PDSCH may include a collision resolution ID.

Data communication is a generic term for downlink communication and uplink communication.

In data communication, the terminal device 1 attempts to detect a PDCCH (attempts to monitor a PDCCH, monitors a PDCCH). in a resource identified at least based on one or all of a control resource set and a search-space-set. It's also called as "the terminal device 1 attempts to detect a PDCCH in a control resource set", "the terminal device 1 attempts to detect a PDCCH in a search-space-set", "the terminal device 1 attempts to detect a PDCCH candidate in a control resource set", "the terminal device 1 attempts to detect a PDCCH candidate in a search-space-set", "the terminal device 1 attempts to detect a DCI format in a control resource set", or "the terminal device 1 attempts to detect a DCI format in a search-space-set".

The control resource set is a set of resources configured by a number of resource blocks and a predetermined number of OFDM symbols in a slot.

The set of resources for the control resource set may be indicated by higher-layer parameters. The number of OFDM symbols included in the control resource set may be indicated by higher-layer parameters.

A PDCCH may be also called as a PDCCH candidate.

A search-space-set is defined as a set of PDCCH candidates. A search-space-set may be a Common Search Space (CSS) set or a UE-specific Search Space (USS) set.

The CSS set is a generic name of a type-0 PDCCH common search-space-set, a type-0a PDCCH common search-space-set, a type-1 PDCCH common search-space-set, a type-2 PDCCH common search-space-set, and a type-3 PDCCH common search-space-set. The USS set may be also called as UE-specific PDCCH search-space-set.

The type-0 PDCCH common search-space-set may be used as a common search-space-set with index 0. The type-0 PDCCH common search-space-set may be an common search-space-set with index 0.

A search-space-set is associated with (included in, corresponding to) a control resource set. The index of the control resource set associated with the search-space-set may be indicated by higher-layer parameters.

For a search-space-set, a part or all of 6A to 6C may be indicated at least by higher-layer parameters. The 6A is PDCCH monitoring period. The 6B is PDCCH monitoring pattern within a slot. The 6C is PDCCH monitoring offset.

A monitoring occasion of a search-space-set may correspond to one or more OFDM symbols in which the first OFDM symbol of the control resource set associated with the search-space-set is allocated. A monitoring occasion of a search-space-set may correspond to resources identified by the first OFDM symbol of the control resource set associated with the search-space-set. A monitoring occasion of a search-space-set is given based at least on a part or all of PDCCH monitoring periodicity, PDCCH monitoring pattern within a slot, and PDCCH monitoring offset.

Figure 11:
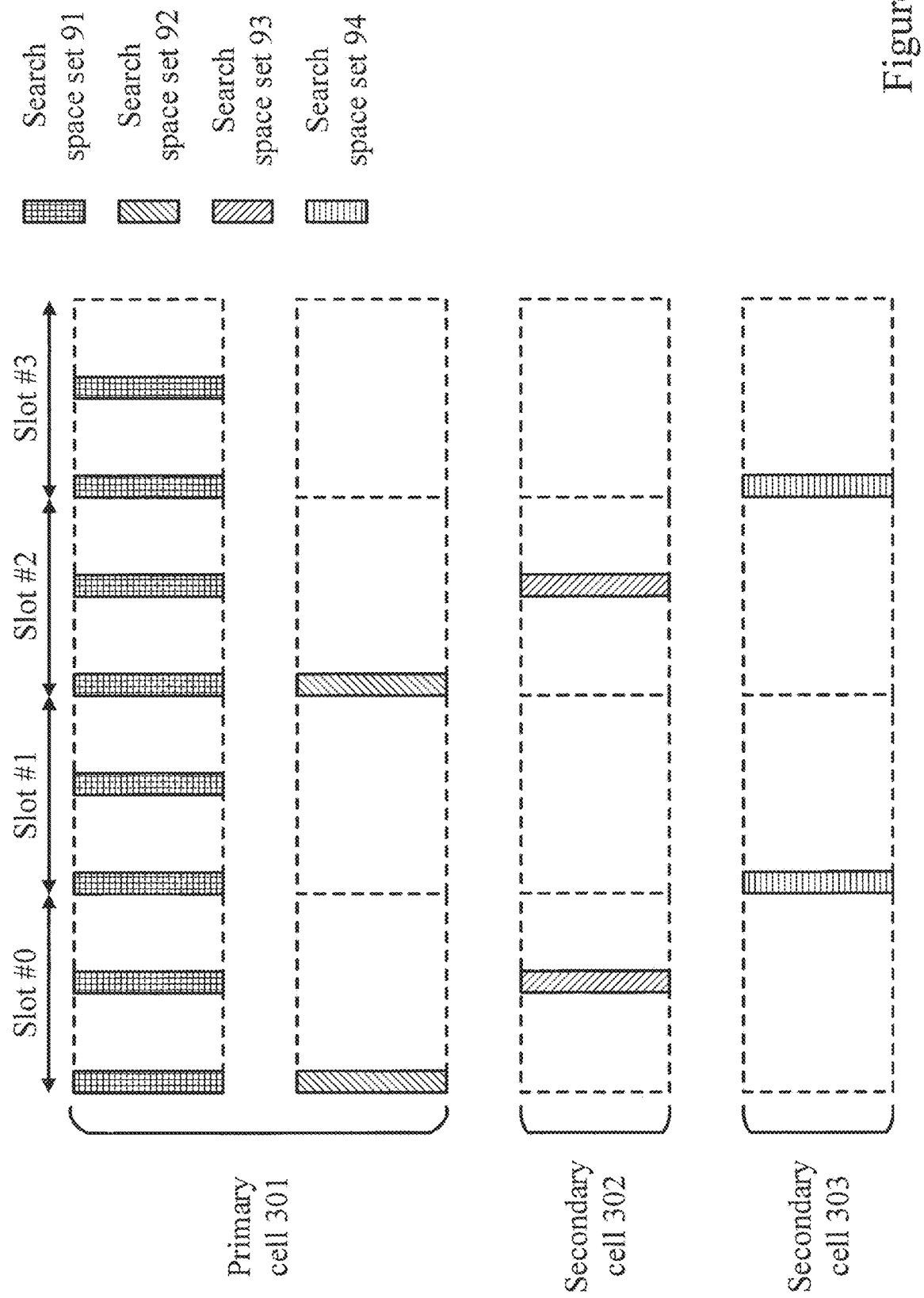
FIG. 11 is a diagram showing an example of the monitoring occasion of the search-space-set according to an aspect of the present embodiment.

FIG. 11 is a diagram showing an example of the monitoring occasion of the search-space-set according to an aspect of the present embodiment. In FIG. 11, the search-space-set 91 and the search-space-set 92 are sets in the primary cell 301, the search-space-set 93 is a set in the secondary cell 302, and the search-space-set 94 is a set in the secondary cell 303.

In FIG. 11, the block indicated by the grid line indicates the search-space-set 91, the block indicated by the upper right diagonal line indicates the search-space-set 92, the block indicated by the upper left diagonal line indicates the search-space-set 93, and the block indicated by the horizontal line indicates the search-space-set 94.

In FIG. 11, the PDCCH monitoring periodicity for the search-space-set 91 is set to 1 slot, the PDCCH monitoring offset for the search-space-set 91 is set to 0 slot, and the PDCCH monitoring pattern for the search-space-set 91 is [1, 0, 0, 0, 0, 0, 0, 1, 0, 0, 0, 0, 0, 0]. That is, the monitoring occasion of the search-space-set 91 corresponds to the first OFDM symbol (OFDM symbol #0) and the eighth OFDM symbol (OFDM symbol #7) in each of the slots.

In FIG. 11, the PDCCH monitoring periodicity for the search-space-set 92 is set to 2 slots, the PDCCH monitoring offset for the search-space-set 92 is set to 0 slots, and the PDCCH monitoring pattern for the search-space-set 92 is [1, 0, 0, 0, 0, 0, 0, 0, 0, 0, 0, 0, 0, 0]. That is, the monitoring occasion of the search-space-set 92 corresponds to the leading OFDM symbol (OFDM symbol #0) in each of the even slots.

In FIG. 11, the PDCCH monitoring periodicity for the search-space-set 93 is set to 2 slots, the PDCCH monitoring offset for the search-space-set 93 is set to 0 slots, and the PDCCH monitoring pattern for the search-space-set 93 is [0, 0, 0, 0, 0, 0, 0, 1, 0, 0, 0, 0, 0, 0]. That is, the monitoring occasion of the search-space-set 93 corresponds to the eighth OFDM symbol (OFDM symbol #8) in each of the even slots.

In FIG. 11, the PDCCH monitoring periodicity for the search-space-set 94 is set to 2 slots, the PDCCH monitoring offset for the search-space-set 94 is set to 1 slot, and the PDCCH monitoring pattern for the search-space-set 94 is [1, 0, 0, 0, 0, 0, 0, 0, 0, 0, 0, 0, 0, 0]. That is, the monitoring occasion of the search-space-set 94 corresponds to the leading OFDM symbol (OFDM symbol #0) in each of the odd slots.

The type-0 PDCCH common search-space-set may be at least used for a DCI format with a cyclic redundancy check (CRC) sequence scrambled by an SI-RNTI (System Information-Radio Network Temporary Identifier).

The type-0a PDCCH common search-space-set may be used at least for a DCI format with a cyclic redundancy check sequence scrambled by an SI-RNTI.

The type-1 PDCCH common search-space-set may be used at least for a DCI format with a CRC sequence scrambled by an RA-RNTI (Random Access-Radio Network Temporary Identifier) or a CRC sequence scrambled by a TC-RNTI (Temporary Cell-Radio Network Temporary Identifier).

The type-2 PDCCH common search-space-set may be used for a DCI format with a CRC sequence scrambled by P-RNTI (Paging-Radio Network Temporary Identifier).

The type-3 PDCCH common search-space-set may be used for a DCI format with a CRC sequence scrambled by a C-RNTI (Cell-Radio Network Temporary Identifier).

The UE-specific search-space-set may be used at least for a DCI format with a CRC sequence scrambled by a C-RNTI.

In downlink communication, the terminal device 1 may detect a downlink DCI format. The detected downlink DCI format is at least used for resource assignment for a PDSCH. The detected downlink DCI format is also referred to as downlink assignment. The terminal device 1 attempts to receive the PDSCH. Based on a PUCCH resource indicated based on the detected downlink DCI format, an HARQ-ACK corresponding to the PDSCH (HARQ-ACK corresponding to a transport block included in the PDSCH) may be reported to the base station device 3.

In uplink communication, the terminal device 1 may detect an uplink DCI format. The detected uplink DCI format is at least used for resource assignment for a PUSCH. The detected uplink DCI format is also referred to as uplink grant. The terminal device 1 transmits the PUSCH.

The base station device 3 and the terminal device 1 may perform a channel access procedure in the serving cell c. The base station device 3 and the terminal device 1 may perform transmission of a transmission wave in the serving cell c. For example, the serving cell c may be a serving cell configured in an Unlicensed band. The transmission wave is a physical signal transmitted from the base station device 3 to the medium or a physical signal transmitted from the terminal device 1 to the medium.

The base station device 3 and the terminal device 1 may perform a channel access procedure on the carrier f of the serving cell c. The base station device 3 and the terminal device 1 may perform transmission of a transmission wave on the carrier f of the serving cell c. The carrier f is a carrier included in the serving cell c. The carrier f may be configured by a set of resource blocks given based on higher-layer parameters.

The base station device 3 and the terminal device 1 may perform a channel access procedure on the carrier f of the serving cell c. The base station device 3 and the terminal device 1 may perform transmission of a transmission wave on the BWP b of the carrier f of the serving cell c. The BWP b is a subset of resource blocks included in the carrier f.

The base station device 3 and the terminal device 1 may perform the channel access procedure in the BWP b of the carrier f of the serving cell c. The base station device 3 and the terminal device 1 may perform transmission of a transmission wave in the carrier f of the serving cell c. Carrying out transmission of the transmission wave on the carrier f of the serving cell c may be transmission of the transmission wave on any set of the BWPs included in the carrier f of the serving cell c.

The base station device 3 and the terminal device 1 may perform the channel access procedure in the BWP b of the carrier f of the serving cell c. The base station device 3 and the terminal device 1 may transmit a transmission wave in the BWP b of the carrier f of the serving cell c.

The channel access procedure may include at least one or both of a first sensing and a counting procedure. The first channel access procedure may include a first measurement. The first channel access procedure may not include the counting procedure. The second channel access procedure may at least include both the first measurement and the counting procedure. The channel access procedure is a designation including a part or all of the first channel access procedure and the second channel access procedure.

After the first channel access procedure is performed, a transmission wave including at least an SS/PBCH block may be transmitted. After the first channel access procedure is performed, the gNB may transmit at least a part or all of an SS/PBCH block, a PDSCH including broadcast information, PDCCH including DCI format used for scheduling of the PDSCH, and a CSI-RS. After the second channel access procedure is performed, a transmission wave including at least a PDSCH including information which is other than the broadcast information may be transmitted. The PDSCH including the broadcast information may include at least a part or all of a PDSCH including system information, a PDSCH including paging information, and a PDSCH used for random-access (e.g., message 2 and/or message 4).

A transmission wave including at least a part or all of an SS/PBCH block, a PDSCH including broadcast information, a PDCCH including a DCI format used for scheduling the PDSCH, and a CSI-RS is also referred to as DRS (Discovery Reference Signal). The DRS may be a set of physical signals transmitted after the first channel access procedure.

If the period of the DRS is less than or equal to a predetermined length and the duty cycle of the DRS is less than or equal to a predetermined value, a transmission wave including the DRS may be transmitted after the first channel access procedure is performed. When the duration of the DRS exceeds the predetermined length, a transmission wave including the DRS may be transmitted after the second channel access procedure is performed. When the duty cycle of the DRS exceeds the predetermined value, a transmission wave including the DRS may be transmitted after the second channel access procedure is performed. For example, the predetermined length may be 1 ms. For example, the predetermined value may be 1/20.

Transmission of a transmission wave after the channel access procedure is performed may be transmission of the transmission wave based on the channel access procedure.

The first measurement may be that the medium is detected to be idle during one or more LBT slot durations of the defer duration. Here, LBT (Listen-Before-Talk) may be a procedure in which whether the medium is idle or busy is given based on carrier sense. The carrier sense may be to perform energy detection in the medium. For example, the "busy" may be a state in which the amount of energy detected by the carrier sense is equal to or larger than a predetermined threshold. The "idle" may be a state in which the amount of energy detected by the carrier sense is smaller than the predetermined threshold. Also, it may be the "idle" that the amount of energy detected by the carrier sense is equal to the predetermined threshold. Also, it may be the "busy" that the amount of energy detected by the carrier sense is equal to the predetermined threshold.

An LBT slot duration is a time unit of LBT. For each LBT slot duration, whether the medium is idle or busy may be provided. For example, the LBT slot duration may be 9 microseconds.

The postponement duration $T_d$ may include at least a duration $T_f$ and one or more LBT slot durations. For example, the duration $T_f$ may be 16 microseconds.

Figure 12:
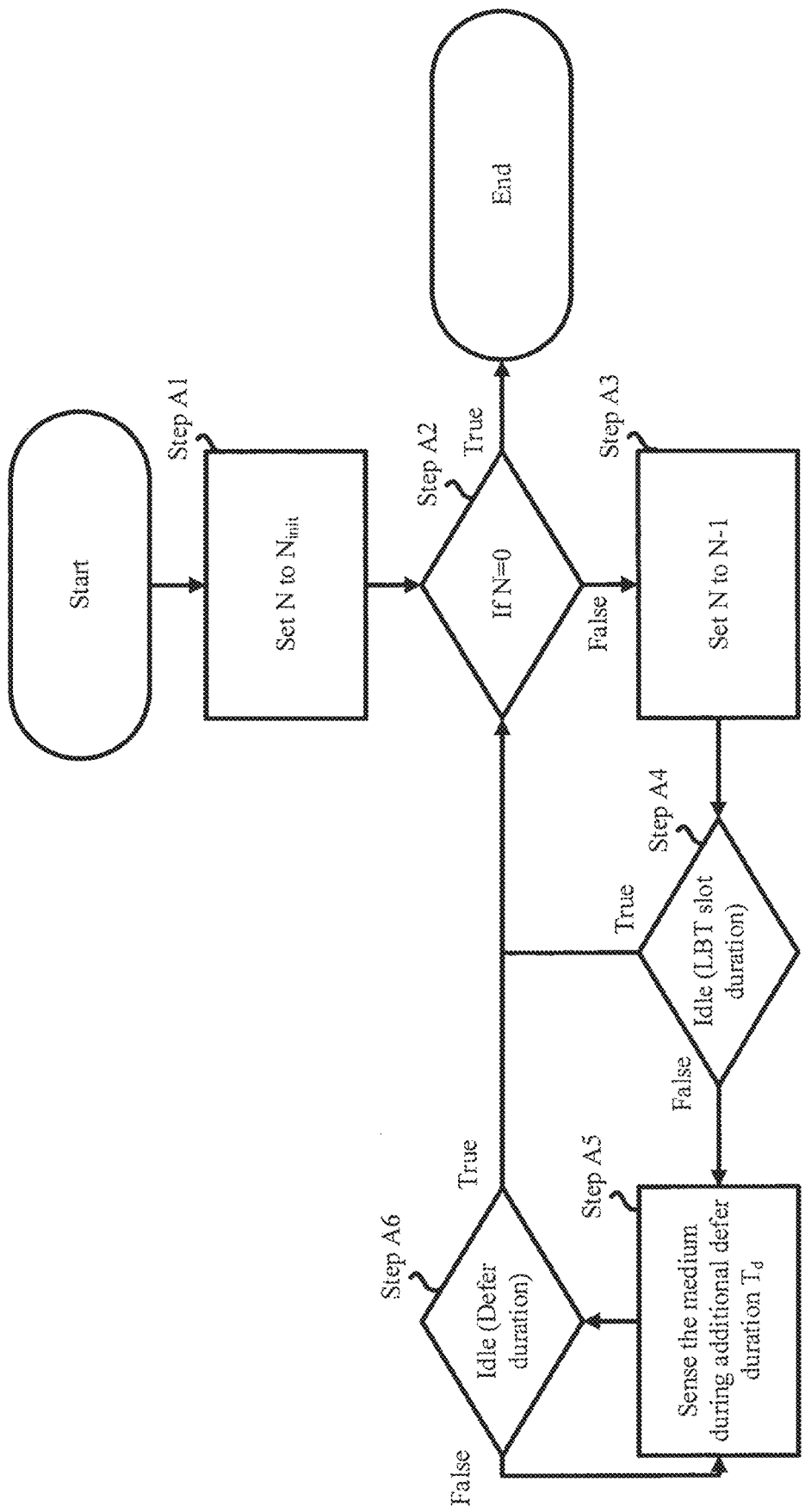
FIG. 12 is a diagram illustrating an example of the counting procedure according to an aspect of the present embodiment.

FIG. 12 is a diagram illustrating an example of the counting procedure according to an aspect of the present embodiment. The counting procedure includes at least a part or all of steps A1 to A6. Step A1 includes an operation of setting the value of the counter N to $N_{init}$. Here, the $N_{init}$ is a value which is randomly (or pseudo-randomly) selected from integer values in the range of 0 to CWp. CWp is a contention window size (CWS) for the channel access priority class p.

In Step A2, whether the value of the counter N is zero or not is determined. Step A2 includes an operation of completing (or terminating) the channel access procedure when the counter N is zero. Step A2 includes an operation of proceeding to step A3 when the counter N is not zero. In FIG. 12, the "true" corresponds to the fact that the evaluation formula is true in the step including the operation of determining the evaluation formula. Also, the "false" corresponds to the fact that the evaluation formula is false in the step including the operation of determining the evaluation formula. In Step A2, the evaluation formula corresponds to the counter N=0.

For example, Step A3 may include the step of decrementing the value of the counter N. Decrementing the value of the counter N may be to reduce the value of the counter N by one. That is, to decrement the value of the counter N may be to set the value of the counter N to N−1.

For example, Step A3 may include the step of decrementing the value of the counter N when N>0. Also, Step A3 may include the step of decrementing the value of the counter N when the base station device 3 or the terminal device 1 selects to decrement the counter N. Step A3 may also include a step of decrementing the value of the counter N when N>0 and the base station device 3 selects to decrement the counter N. Step A3 may also include a step of decrementing the value of the counter N when N>0 and the terminal device 1 selects to decrement the counter N.

For example, Step A4 may include an operation of performing carrier sense of the medium in LBT slot duration d and an operation of proceeding to step A2 if the LBT slot duration d is idle. Further, Step A4 may include an operation of proceeding to Step A2 when it is determined by carrier sense that the LBT slot duration d is idle. Further, Step A4 may include an operation of performing carrier sense in LBT slot duration d and an operation of proceeding to step A5 when LBT slot duration d is busy. Further, Step A4 may include an operation of proceeding to Step A5 when it is determined by carrier sense that the LBT slot duration d is busy. Here, the LBT slot duration d may be the next LBT slot duration of the LBT slot duration already carrier-sensed in the counting procedure. In Step A4, the evaluation formula may correspond to the LBT slot duration d being idle.

In Step A5, the medium is idle until it is detected that the medium is busy in a certain LBT slot duration included in the delay-duration, or in all LBT slot durations included in the delay-duration. It includes an operation of performing carrier sense until "idle" is detected.

Step A6 includes an operation of proceeding to Step A5 when it is detected that the medium is busy in a certain LBT slot duration included in the delay-duration. Step A6 includes an operation that proceeds to step A2 when it is detected that the medium is idle in all LBT slot durations included in the delay-duration. In step A6, the evaluation formula may correspond to the medium being idle in the certain LBT slot duration.

$CW_{min, p}$ indicates the minimum value of the range of possible values of the contention window size CWp for the channel access priority class p. $CW_{max, p}$ indicates the maximum value of the range of possible values of the contention window size CWp for the channel access priority class p.

When a transmission wave including at least a physical channel (for example, PDSCH) associated with the channel access priority class p is transmitted, CWp is managed by the base station device 3 or the terminal device 1. The base station device 3 or the terminal device 1 adjusts the CWp before Step A1 of the counting procedure.

For a PUSCH scheduled by a DCI format with CRC scrambled by a TC-RNTI, frequency domain resource assignment information is provided by a frequency domain resource assignment field in the DCI format. Resource block assignment information in the frequency domain resource assignment information indicates a set of VRBs for the PUSCH. For the DCI format with the CRC scrambled by the TC-RNTI, the frequency domain resource assignment information may not include resource assignment type information.

For a PUSCH scheduled by a random-access response grant, frequency domain resource assignment information is provided by the random-access response grant. Resource block assignment information in the frequency domain resource assignment field indicates a set of VRBs for the PUSCH. Here, the frequency domain resource assignment field is truncated to ceil (log 2 ($N^{size}_{BWP}*(N^{size}_{BWP}+1)/2$)) LSBs (Least Significant Bits) of the frequency domain resource assignment field if $N^{size}_{BWP}$ is equal to or smaller than 180. Here, $N^{size}_{BWP}$ is the number of resource blocks in the initial UL BWP for the terminal device 1 in a case of the PUSCH scheduled by the random-access response grant. Also, floor (log 2 ($N^{size}_{BWP}*(N^{size}_{BWP}+1)/2$)) LSBs (Most Significant Bits) with value set to '0' is appended after $N_{UL,hop}$ bits to the frequency domain resource assignment field if $N^{size}_{BWP}$ is larger than 180. Here, the $N_{UL,hop}$ is the number of bits which indicates frequency-offset value for frequency hopping. The $N_{UL,hop}$ may be 0, 1, or 2 at least based on the value of frequency hopping flag field in the random-access response grant and the value of the $N^{size}_{BWP}$. The truncated frequency domain resource assignment field, or the appended frequency domain resource assignment field provides the frequency domain resource assignment information.

The truncated frequency domain resource assignment field, or the appended frequency domain resource assignment field may be interpreted as for a frequency domain resource assignment field in DCI format 0_0 detected in a CSS set.

The truncated frequency domain resource assignment field, or the appended frequency domain resource assignment field may be interpreted in a same way as for a frequency domain resource assignment field in DCI format 0_0 detected in a CSS set.

The truncated frequency domain resource assignment field, or the appended frequency domain resource assignment field may be interpreted based on the assumption that DCI format 0_0 is detected in a CSS set.

There are at least 3 ways of interpretation of frequency domain resource assignment field. First interpretation is for a case that the DCI format 0_0 is detected in a CSS set. Second interpretation is for a case that the DCI format 0_0 is detected in a USS set, and the number of bits for the frequency domain resource assignment field in the DCI format 0_0 (or the number of bits for the DCI format 0_0) is derived from the size of the active UL BWP for the terminal device 1. Third interpretation is for a case that the DCI format 00 is detected is a USS set, the number of bits for the frequency domain resource assignment field in the DCI format 0_0 (or the number of bits for the DCI format 0_0) is derived from the size of the initial UL BWP for the terminal device 1, and the frequency domain resource assignment field is applied to the active UL BWP which is different from the initial UL BWP.

Resource block assignment information in the frequency domain resource assignment field indicates a set of VRBs for the PUSCH. Frequency domain resource assignment information may include $N_{UL,hop}$ bits of frequency hopping offset information and the resource block assignment information. The VRBs are in the active UL BWP for the terminal device 1.

In the following, the first interpretation for a case that the DCI format 0_0 is detected in a CSS set is described.

Figure 13:
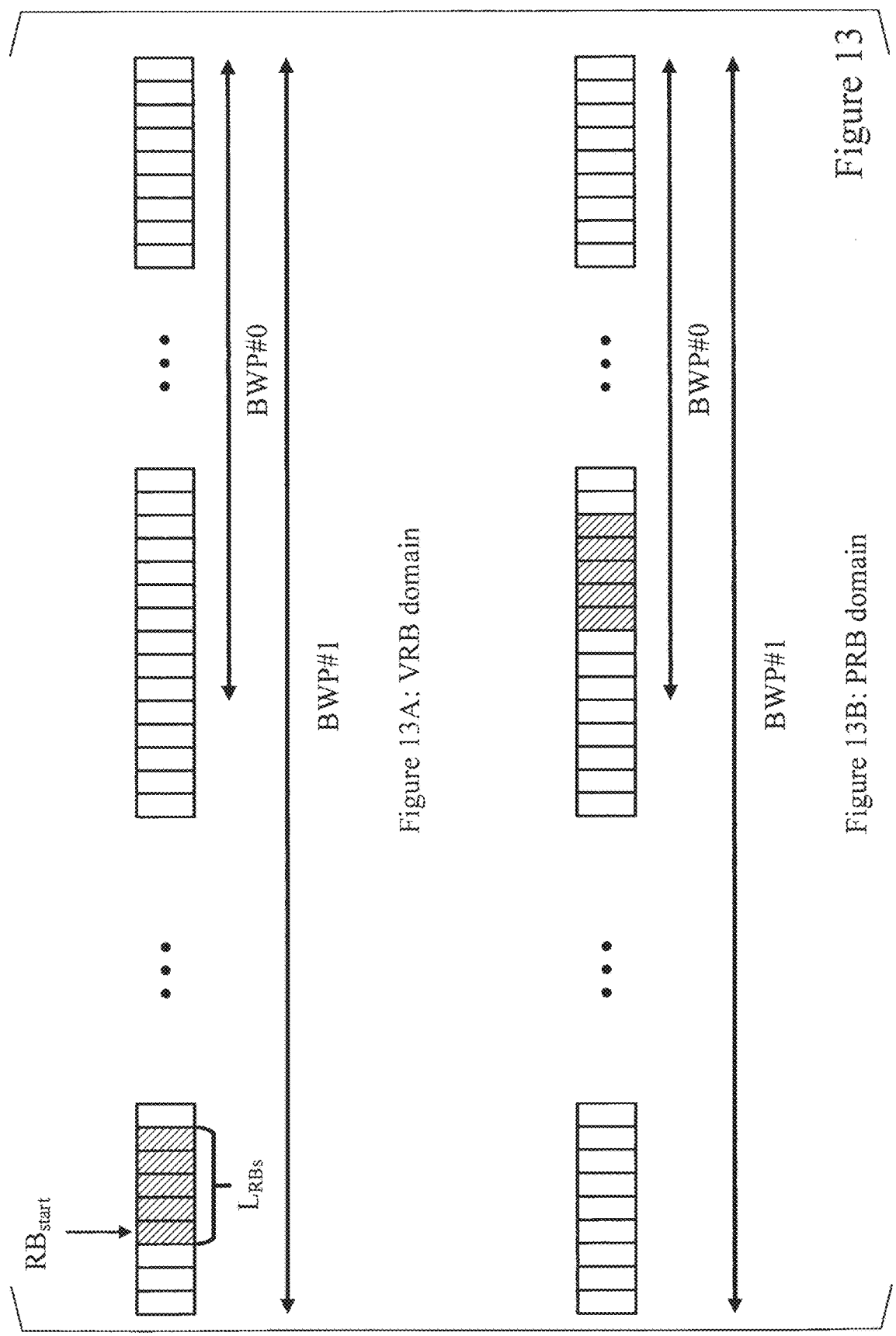
FIG. 13 is an example of frequency domain resource assignment procedure of resource assignment type-1 for a PUSCH according to an aspect of the present embodiment.

FIG. 13 is an example of frequency domain resource assignment procedure of resource assignment type-1 for a PUSCH according to an aspect of the present embodiment. In FIG. 13, each block represents a resource block. In FIG. 13A, each block represents a VRB. In FIG. 13B, each block represents a PRB.

Resource assignment for the PUSCH in the VRB domain is determined by a RIV (Resource Indication Value) which is indicated by the resource block assignment information. The RIV indicates starting VRB with index $RB_{start}$ for the PUSCH and the length in terms of contiguously assigned VRBs of length $L_{RBs}$.

Resource block assignment information is also referred to as type-1 resource allocation field in a case that the resource block assignment information indicates a RIV.

The RIV is equal to $N^{size}_{BWP}*(L_{RBs}-1)+RB_{start}$ in a case that $(L_{RBs}-1)$ is smaller than or equal to floor $(N^{size}_{BWP}/2)$. The RIV is equal to $N^{size}_{BWP}*(N^{size}_{BWP}-L_{RBs}+1)+N^{size}_{BWP}-1-RB_{start}$ in a case that $(L_{RBs}-1)$ larger than floor $(N^{size}_{BWP}/2)$. For the first interpretation, the $N^{size}_{BWP}$ is the number of resource blocks for the initial UL BWP for the terminal device 1. For the second interpretation, the $N^{size}_{BWP}$ is the number of resource blocks for the active UL BWP for the terminal device 1.

For the third interpretation, formula to derive the RIV is different from the first interpretation and the second interpretation.

In FIG. 13A, the VRBs assigned for the PUSCH is indicated by the upper left diagonal line. The VRBs assigned for the PUSCH are mapped to corresponding PRBs by VRB-to-PRB mapping. In the VRB-to-PRB mapping, in a case that condition X is satisfied, VRB with index n is mapped to PRB with index $n+N^{start}_{BWP,0}-N^{start}_{BWP,i}$. Also, in a case that the condition X is not satisfied, VRB with index n is mapped to PRB with index n. The condition X includes a part or all of condition X1, condition X2, condition X3, condition X4, condition X5 and condition X6. The condition X1 is that the PUSCH is scheduled by random-access response grant. The condition X2 is that the PUSCH is scheduled by a DCI format with a CRC scrambled by a TC-RNTI. The condition X3 is that the PUSCH is in the active UL BWP with index i for the terminal device 1 where the $N^{start}_{BWP,i}$ is the index of the starting common resource block of the active UL BWP with index i. The condition X4 is that the active UL BWP with index i includes all physical resource blocks of the initial UL BWP for the terminal device 1 where the $N^{start}_{BWP,0}$ is the index of the starting common resource block of the initial UL BWP. The condition X5 is that the active UL BWP with index i is configured with a subcarrier-spacing same as the one for the initial UL BWP. The condition X6 is that the active UL BWP with index i is configured with CP length same as the one for the initial UL BWP.

For example, the condition X may be that the PUSCH is scheduled by the random-access response grant or the DCI format with the CRC scrambled by the TC-RNTI in the active UL BWP, the active UL BWP includes all physical resource blocks of the initial UL BWP, the active UL BWP has the same subcarrier-spacing as the initial UL BWP, and the active UL BWP has the same CP length as the initial UL BWP.

In FIG. 13B, in a case that the condition X is satisfied, the PRBs assigned for the PUSCH are indicated by the upper left diagonal line based on the VRB-to-PRB mapping.

For NR-U (New Radio-Unlicensed), frequency domain resource assignment procedure for a PUSCH may be enhanced by using interlace-based method to satisfy requirements required for the NR-U. The interlace-based method may be that resource block assignment information indicates a set of interlaces each of which includes one or more resource blocks. Here, each of the interlace may include one or more CRBs, one or more PRBs, or one or more VRBs.

For example, the indication method may be at least based on RIV. Here, in the indication method, the resource block assignment information indicates starting index of an interlace for a PUSCH and the number of interlaces assigned for the PUSCH.

For example, the indication method may be at least based on bitmap. Here, in the indication method, the resource block assignment information includes a bitmap where each bit of the bitmap corresponds to a interlace.

Figure 14:
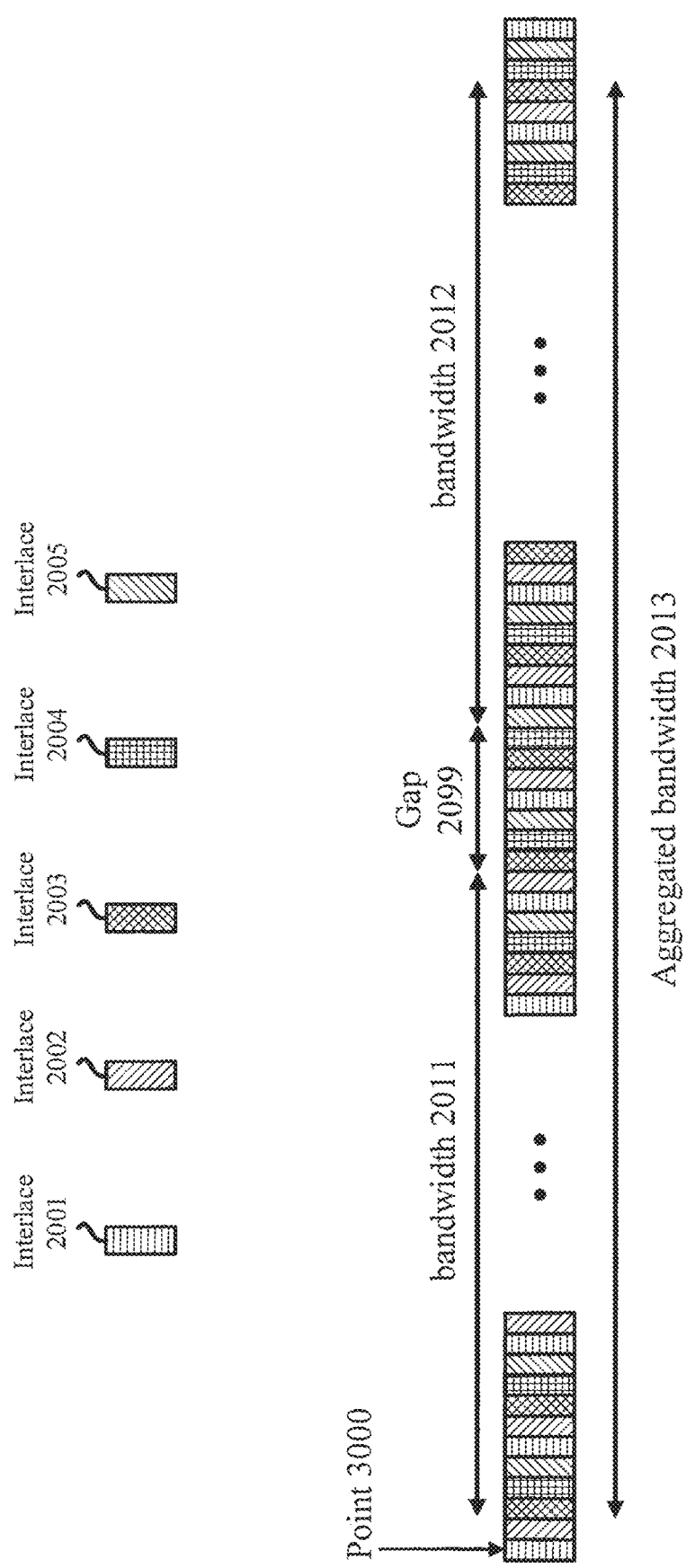
FIG. 14 is an example of interlaces in the frequency domain resource assignment procedure according to an aspect of the present embodiment.

FIG. 14 is an example of interlaces in the frequency domain resource assignment procedure according to an aspect of the present embodiment. In FIG. 14, each block represents a resource block. Also, the horizontal line represents interlace 2001. Also, the upper left diagonal line represents interlace 2002. Also, the diagonal grid line represents interlace 2003. Also, the grid line represents interlace 2004. Also, the upper right diagonal line represents the interlace 2005. The total number $N_M$ of interlaces in a BWP (or SCS-specific carrier) may be 5, 10, or others.

As in FIG. 14, each resource block in the aggregated bandwidth 2013 may be included in a interlace. Index of the interlace may be allocated to each resource block cyclically in the frequency domain. Here, the point 3000 is a reference point of interlace index allocation. For example, as in FIG. 14, index 0 may be allocated for the resource block including the subcarrier with the center frequency same as the point 3000. For example, the interlace index $I_L$ for common resource block with index $I_{CRB}$ may be given at least based on relationship $I_L = \mod(I_{CRB}, N_M)$. Here, the $N_M$ is the number of interlaces in a BWP (or in a SCS-specific carrier). For example, the interlace index $I_L$ for virtual resource block with index $Iv_{RB}$ in the BWP with index i may be given at least based on relationship $I_L = \mod(I_{VRB}+N^{start,u}_{BWP,i}, N_M)$. Here, the $N^{start,u}_{BWP,i}$ indicates the reference point of the BWP with index i. For example, the interlace with index $I_L$ may include a set of virtual resource blocks. Each of the virtual resource blocks with index $I_{VRB}$ satisfies $I_L = \mod(I_{VRB}+N^{start,u}_{BWP,i}, N_M)$.

In FIG. 14, there is gap 2099 between bandwidth 2011 and bandwidth 2012. The gap may be used for potential guard band for the bandwidth 2011 and the bandwidth 2012. It may be possible there is no gap between the bandwidth 2011 and the bandwidth 2012.

The bandwidth 2011, the bandwidth 2012 and the gap 2099 may be aggregated as the aggregated bandwidth 2013.

Figure 15:
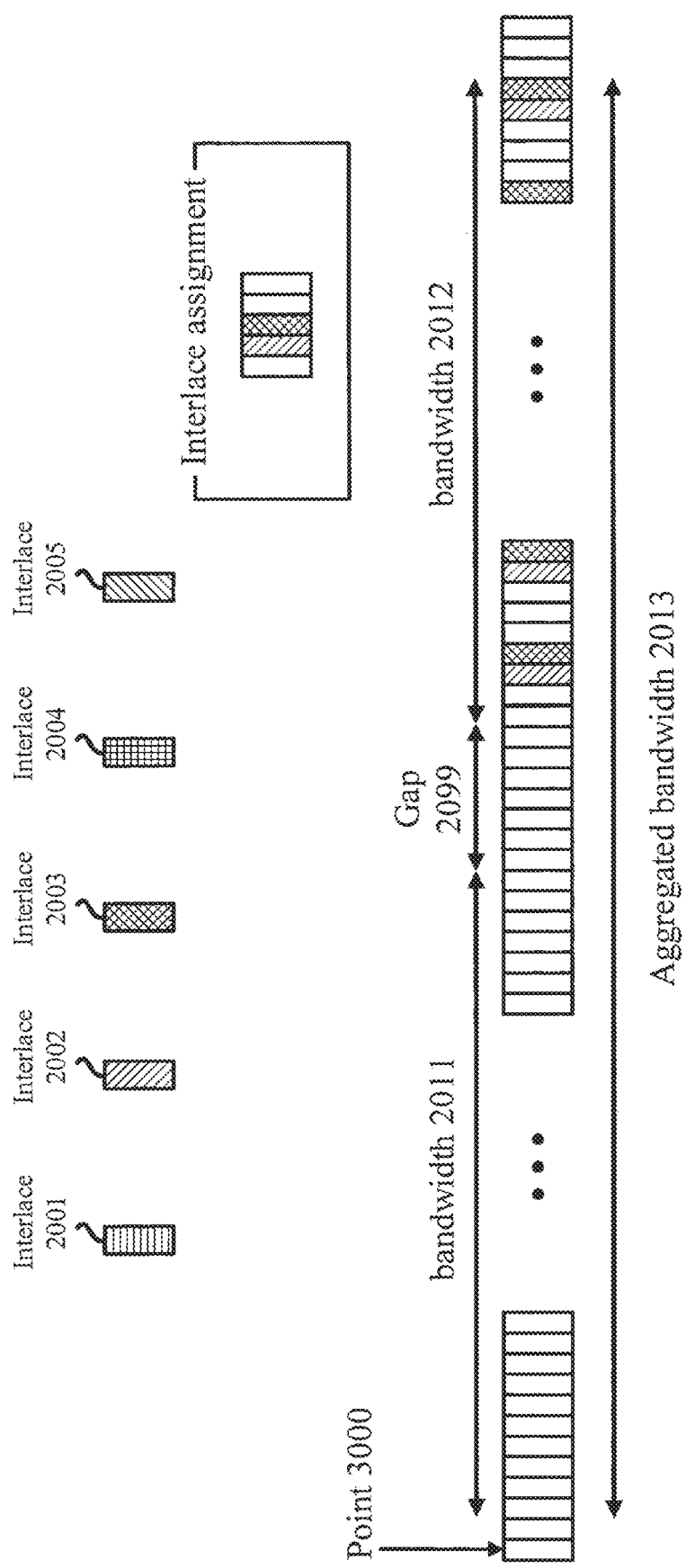
FIG. 15 is an example of the frequency domain resource assignment procedure according to an aspect of the present embodiment.

FIG. 15 is an example of the frequency domain resource assignment procedure according to an aspect of the present embodiment. In FIG. 15, it is assumed that the resource block assignment information indicates interlace 2002 and interlace 2003. Also, it is assumed that the bandwidth 2012 is configured as the active UL BWP for the terminal device 1. Also, it is assumed that the resource blocks described in FIG. 15 is VRBs. In this case, the assigned VRBs for a PUSCH may be represented by the upper left diagonal line and the diagonal grid line. All other outlined blocks are not assigned for the PUSCH.

In a case that the resource block assignment information indicates a set of interlaces for a PUSCH, the assigned VRBs for the PUSCH may be the VRBs included in the set of interlaces. Here, the VRBs are defined within the active UL BWP for the terminal device 1.

Figure 16:
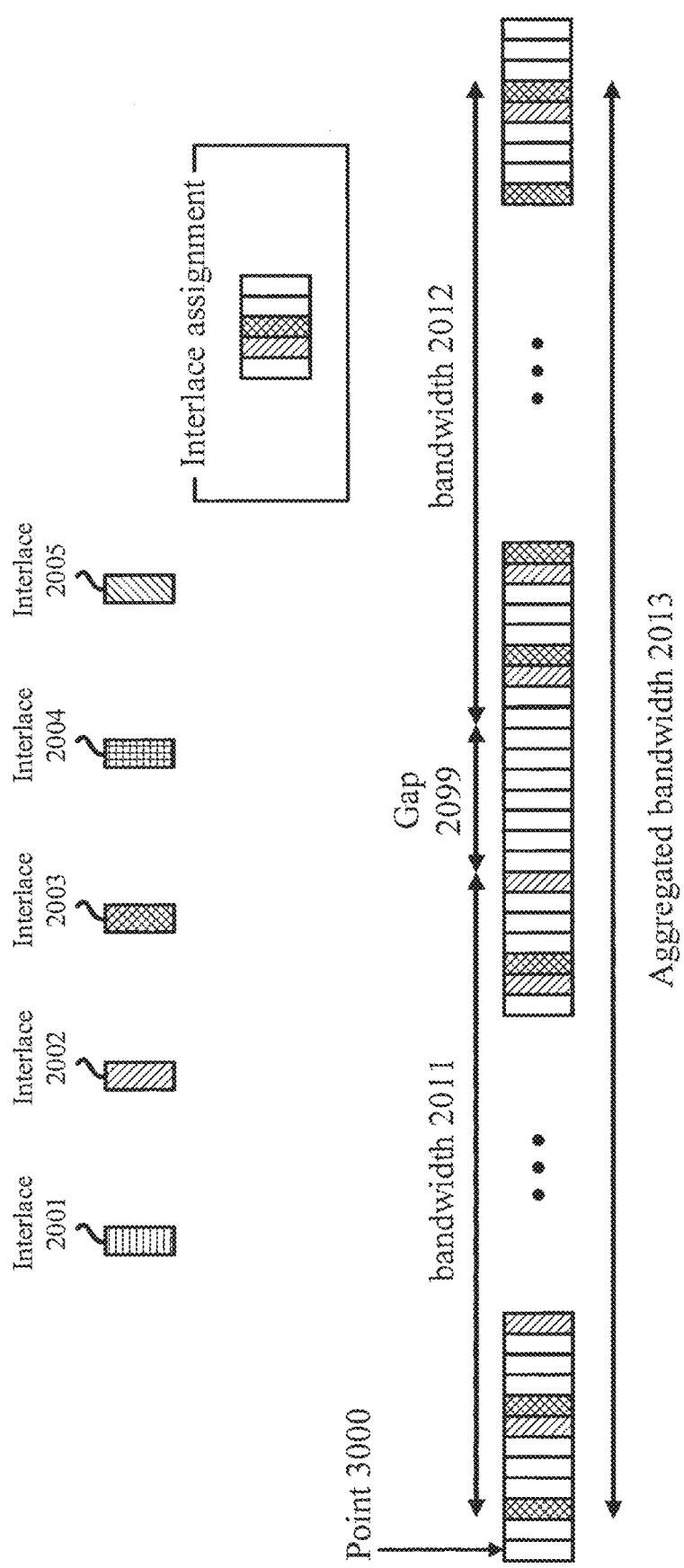
FIG. 16 is an example of the frequency domain resource assignment procedure according to an aspect of the present embodiment.

FIG. 16 is an example of the frequency domain resource assignment procedure according to an aspect of the present embodiment. In FIG. 16, it is assumed that the resource block assignment information indicates interlace 2002 and interlace 2003. Also, it is assumed that the aggregated bandwidth 2013 is configured as the active UL BWP for the terminal device 1. Also, it is assumed that the resource blocks described in FIG. 16 is VRBs. In this case, the assigned VRBs for a PUSCH may be represented by the upper left diagonal line and the diagonal grid line. All other outlined blocks are not assigned for the PUSCH.

In a case that the resource block assignment information indicates a set of interlaces for a PUSCH, the assigned VRBs for the PUSCH may be the VRBs included in the set of interlaces. Here, the VRBs are defined within the active UL BWP for the terminal device 1.

Figure 17:
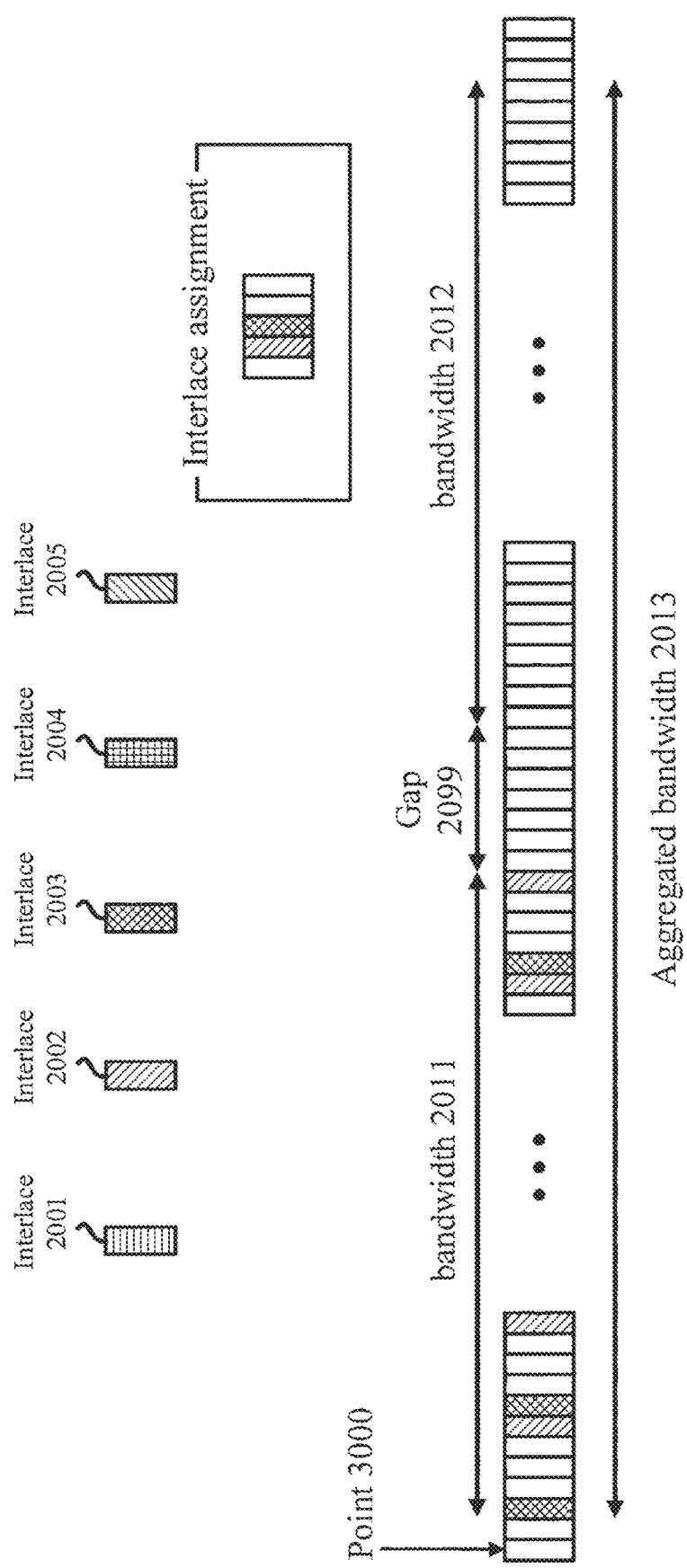
FIG. 17 is an example of the frequency domain resource assignment procedure according to an aspect of the present embodiment.

FIG. 17 is an example of the frequency domain resource assignment procedure according to an aspect of the present embodiment. In FIG. 17, it is assumed that the resource block assignment information indicates interlace 2002 and interlace 2003. Also, it is assumed that the aggregated bandwidth 2013 is configured as the active UL BWP for the terminal device 1. Also, it is assumed that the bandwidth 2012 is configured as the initial UL BWP for the terminal device 1. Also, it is assumed that the resource blocks described in FIG. 16 is VRBs. In this case, the assigned VRBs for a PUSCH may be represented by the upper left diagonal line and the diagonal grid line. All other outlined blocks are not assigned for the PUSCH.

In a case that the resource block assignment information indicates a set of interlaces for a PUSCH, the assigned VRBs for the PUSCH may be the VRBs within a bandwidth included in the set of interlaces. Here, the VRBs are defined within the active UL BWP for the terminal device 1. Also, the bandwidth is defined such that the same number of resource blocks as the initial UL BWP but the bandwidth starts from the starting VRB in the active UL BWP.

For a PUSCH scheduled by random-access response grant or a DCI format with CRC scrambled by a TC-RNTI, since the base station device 3 cannot identify the terminal device that the base station device 3 needs to grant the PUSCH, the resource block assignment for the PUSCH needs to be carefully handled. For example, the resource block assignment may be same regardless of the active UL BWP of the terminal device.

In a first solution, in a first case that the condition X is satisfied, the active UL BWP is a UL BWP (a UL BWP with index i) which is different from the initial UL BWP, and the resource block assignment information indicates one or more interlaces, the first resource blocks assigned for the PUSCH may be resource blocks included in the one or more interlaces in the initial UL BWP. If the first resource blocks are VRBs, the VRB with index n is mapped to PRB with index n.

In the first solution, in a second case that a PUSCH is scheduled by a DCI format 0_0 with CRC scrambled by a C-RNTI detected in a CSS set, the active UL BWP is a UL BWP (a UL BWP with index i) which is different from the initial UL BWP, and the resource block assignment information indicates one or more interlaces, the second resource blocks assigned for the PUSCH may be resource blocks included in the one or more interlaces in the initial UL BWP. If the second resource blocks are VRBs, the VRB with index n is mapped to PRB with index n.

In the first solution, in a third case that a PUSCH is scheduled by a DCI format 0_0 with CRC scrambled by a C-RNTI detected in a CSS set, the active UL BWP is a UL BWP (a UL BWP with index i) which is different from the initial UL BWP, and the resource block assignment information indicates one or more interlaces, the third resource blocks assigned for the PUSCH may be resource blocks included in the one or more interlaces in the active UL BWP. If the third resource blocks are VRBs, the VRB with index n is mapped to PRB with index n.

In the first solution, in a fourth case that a PUSCH is scheduled by a DCI format 0_0 with CRC scrambled by a C-RNTI detected in a USS set, the active UL BWP is a UL BWP (a UL BWP with index i) which is different from the initial UL BWP, and the resource block assignment information indicates one or more interlaces, the fourth resource blocks assigned for the PUSCH may be resource blocks included in the one or more interlaces in the active UL BWP. If the fourth resource blocks are VRBs, the VRB with index n is mapped to PRB with index n.

In the first solution, in a fifth case that a PUSCH is scheduled by a DCI format 0_1 with CRC scrambled by a C-RNTI, the active UL BWP is a UL BWP (a UL BWP with index i) which is different from the initial UL BWP, and the resource block assignment information indicates one or more interlaces, the fifth resource blocks assigned for the PUSCH may be resource blocks included in the one or more interlaces in the active UL BWP. If the fifth resource blocks are VRBs, the VRB with index n is mapped to PRB with index n.

In the first solution, in a sixth case that the condition X is satisfied, the active UL BWP is the initial UL BWP, and the resource block assignment information indicates one or more interlaces, the sixth resource blocks assigned for the PUSCH may be resource blocks included in the one or more interlaces in the initial UL BWP. If the sixth resource blocks are VRBs, the VRB with index n is mapped to PRB with index n.

In the first solution, in a seventh case that the condition X is not satisfied, the active UL BWP is a UL BWP (a UL BWP with index i) which is different from the initial UL BWP, and the resource block assignment information indicates a set of interlaces, the seventh resource blocks assigned for the PUSCH may be resource blocks included in the set of interlaces in the active UL BWP. If the fifth resource blocks are VRBs, the VRB with index n is mapped to PRB with index n.

In the first solution, in a case that the active UL BWP is a UL BWP (a UL BWP with index i) which is different from the initial UL BWP, and the resource block assignment information indicates one or more interlaces, the eighth resource blocks assigned for the PUSCH may be resource blocks included in the one or more interlaces in the initial UL BWP. If the eighth resource blocks are VRBs, the VRB with index n is mapped to PRB with index n. In a case that the active UL BWP is the initial UL BWP, and the resource block assignment information indicates the one or more interlaces, the ninth resource blocks assigned for the PUSCH may be resource blocks included in the one or more interlaces in the initial UL BWP. If the ninth resource blocks are VRBs, the VRB with index n is mapped to PRB with index n. The eighth resource blocks may be the same as the ninth resource blocks.

In the first solution, the interlace allocation may be at least based on the relationship $I_L = \mod(I_{CRB}, N_M)$, or $I_L = \mod(I_{VRB} + N^{start,u}_{BWP,i}, N_M)$. Here, the $N^{start,u}_{BWP,i}$ indicates the reference point of the UL BWP with index i. In the first solution, the interlace with index $I_L$ may include resource blocks with index $I_{VRB}$ which satisfies the relationship.

In the first solution, the first resource blocks may be the same as the sixth resource blocks in a case that the set of interlaces indicated by the resource block assignment information is the same and the initial UL BWP includes different set of resource blocks from the UL BWP.

In the first solution, the first resource blocks may be different from the third (or fourth, fifth, seventh) resource blocks in a case that the set of interlaces indicated by the resource block assignment information is the same and the initial UL BWP includes different set of resource blocks from the UL BWP.

In a second solution, in the first case that the condition X is satisfied, the active UL BWP is a UL BWP (a UL BWP with index i) which is different from the initial UL BWP, and the resource block assignment information indicates one or more interlaces, the tenth resource blocks assigned for the PUSCH may be resource blocks included in the one or more interlaces in the active UL BWP with the limited bandwidth. The starting resource block of the limited bandwidth may be the same as the starting resource block of the active UL BWP. The length of the limited bandwidth may be the same as the length of the initial UL BWP in terms of resource blocks. If the tenth resource blocks are VRBs, the VRB with index n is mapped to PRB with index $n+N_{VRBtoPRB,second}$. For example, the $N_{VRBtoPRB,second}$ may be $N^{start}_{BWP,0}-N^{start}_{BWP,i}+I^{start}_{L,0}-I^{start}_{L,i}$. For example, the $N_{VRBtoPRB,second}$ may be $N^{start}_{BWP,0}-N^{start}_{BWP,i}-I^{start}_{L,0}+I^{start}_{L,i}$. For example, the $N_{VRBtoPRB,second}$ may be $N^{start}_{BWP,0}-N^{start}_{BWP,i}+I^{start}_{L,0}-I^{start}_{L,i}+M_L$. For example, the $N_{VRBtoPRB,second}$ may be $N^{start}_{BWP,0}-N^{start}_{BWP,i}-I^{start}_{L,0}+I^{start}_{L,i}+M_L$. For example, the $N_{VRBtoPRB,second}$ may be given at least based on a part or all of the $N^{start}_{BWP,0}$, $N^{start}_{BWP,i}$, $I^{start}_{L,0}$, $I^{start}_{L,i}$, and $M_L$. Here, the $I^{start}_{L,0}$ is the interlace index of the starting resource block in the initial UL BWP. Also, the $I^{start}_{L,i}$ is the interlace index of the starting resource block in the UL BWP with index i.

In the second solution, in the second case that a PUSCH is scheduled by a DCI format 0_0 with CRC scrambled by a C-RNTI detected in a CSS set, the active UL BWP is a UL BWP (a UL BWP with index i) which is different from the initial UL BWP, and the resource block assignment information indicates one or more interlaces, the eleventh resource blocks assigned for the PUSCH may be resource blocks included in the one or more interlaces in the active UL BWP with the limited bandwidth. The length of the limited bandwidth is same as the length of the initial UL BWP in terms of resource blocks. For example, if the eleventh resource blocks are VRBs, the VRB with index n may be mapped to PRB with index $n+N_{VRBtoPRB,second}$. For example, if the eleventh resource blocks are VRBs, the VRB with index n may be mapped to the PRB with index $n+N^{start}_{BWP,0}-N^{start}_{BWP,i}$.

In the second solution, in the third case that a PUSCH is scheduled by a DCI format 0_0 with CRC scrambled by a C-RNTI detected in a CSS set, the active UL BWP is a UL BWP (a UL BWP with index i) which is different from the initial UL BWP, and the resource block assignment information indicates one or more interlaces, the twelfth resource blocks assigned for the PUSCH may be resource blocks included in the one or more interlaces in the active UL BWP. For example, if the twelfth resource blocks are VRBs, the VRB with index n may be mapped to PRB with index n.

In the second solution, in the fourth case that a PUSCH is scheduled by a DCI format 0_0 with CRC scrambled by a C-RNTI detected in a USS set, the active UL BWP is a UL BWP (a UL BWP with index i) which is different from the initial UL BWP, and the resource block assignment information indicates one or more interlaces, the thirteenth resource blocks assigned for the PUSCH may be resource blocks included in the one or more interlaces in the active UL BWP. For example, if the thirteenth resource blocks are VRBs, the VRB with index n may be mapped to PRB with index n.

In the second solution, in the fifth case that a PUSCH is scheduled by a DCI format 0_1 with CRC scrambled by a C-RNTI, the active UL BWP is a UL BWP (a UL BWP with index i) which is different from the initial UL BWP, and the resource block assignment information indicates one or more interlaces, the fourteenth resource blocks assigned for the PUSCH may be resource blocks included in the one or more interlaces in the active UL BWP. For example, if the fourteenth resource blocks are VRBs, the VRB with index n may be mapped to PRB with index n.

In the second solution, in the sixth case that the condition X is satisfied, the active UL BWP is the initial UL BWP, and the resource block assignment information indicates one or more interlaces, the fifteenth resource blocks assigned for the PUSCH may be resource blocks included in the one or more interlaces in the active UL BWP. For example, if the fifteenth resource blocks are VRBs, the VRB with index n may be mapped to PRB with index n.

In the second solution, in the seventh case that the condition X is not satisfied, the active UL BWP is a UL BWP (a UL BWP with index i) which is different from the initial UL BWP, and the resource block assignment information indicates one or more interlaces, the sixteenth resource blocks assigned for the PUSCH may be resource blocks included in the one or more interlaces in the active UL BWP. For example, if the sixteenth resource blocks are VRBs, the VRB with index n may be mapped to PRB with index n.

In the second solution, the interlace allocation may be at least based on the relationship $I_L=\mod(I_{CRB}, N_M)$, or $I_L=\mod(I_{VRB}+N^{start,u}_{BWP,i}, N_M)$. Here, the $N^{start,u}_{BWP,i}$ indicates the reference point of the UL BWP with index i.

In the second solution, the tenth resource blocks may be the same as the fifteenth resource blocks in a case that the one or more interlaces indicated by the resource block assignment information is the same and the initial UL BWP includes different set of resource blocks from the UL BWP. In the second solution, the $N_{VRBtoPRB,second}$ may be set such that the tenth resource blocks and the fifteenth resource blocks are the same.

In the second solution, the tenth resource blocks may be different from the twelfth (or thirteenth, fourteenth, sixteenth) resource blocks in a case that the one or more interlaces indicated by the resource block assignment information is the same and the initial UL BWP includes different set of resource blocks from the UL BWP.

In a third solution, in the first case that the condition X is satisfied, the active UL BWP is a UL BWP (a UL BWP with index i) which is different from the initial UL BWP, and the resource block assignment information indicates one or more interlaces, the seventeenth resource blocks assigned for the PUSCH may be resource blocks included in the one or more interlaces in the active UL BWP with the limited bandwidth. The starting resource block of the limited bandwidth is same as the starting resource block of the active UL BWP. The length of the limited bandwidth is same as the length of the initial UL BWP in terms of resource blocks. If the seventeenth resource blocks are VRBs, the VRB with index n is mapped to PRB with index $n+N^{start}_{BWP,0}-N^{start}_{BWP,i}$.

In the third solution, in the second case that a PUSCH is scheduled by a DCI format 0_0 with CRC scrambled by a C-RNTI detected in a CSS set, the active UL BWP is a UL BWP (a UL BWP with index i) which is different from the initial UL BWP, and the resource block assignment information indicates one or more interlaces, the eighteenth resource blocks assigned for the PUSCH may be resource blocks included in the one or more interlaces in the active UL BWP with the limited bandwidth. The length of the limited bandwidth is same as the length of the initial UL BWP in terms of resource blocks. For example, if the eighteenth resource blocks are VRBs, the VRB with index n may be mapped to PRB with index $n+N^{start}_{BWP,0}-N^{start}_{BWP,i}$.

In the third solution, in the third case that a PUSCH is scheduled by a DCI format 0_0 with CRC scrambled by a C-RNTI detected in a CSS set, the active UL BWP is a UL BWP (a UL BWP with index i) which is different from the initial UL BWP, and the resource block assignment information indicates one or more interlaces, the nineteenth resource blocks assigned for the PUSCH may be resource blocks included in the one or more interlaces in the active UL BWP. For example, if the nineteenth resource blocks are VRBs, the VRB with index n may be mapped to PRB with index n.

In the third solution, in the fourth case that a PUSCH is scheduled by a DCI format 0_0 with CRC scrambled by a C-RNTI detected in a USS set, the active UL BWP is a UL BWP (a UL BWP with index i) which is different from the initial UL BWP, and the resource block assignment information indicates one or more interlaces, the twentieth resource blocks assigned for the PUSCH may be resource blocks included in the one or more interlaces in the active UL BWP. For example, if the twentieth resource blocks are VRBs, the VRB with index n may be mapped to PRB with index n.

In the third solution, in the fifth case that a PUSCH is scheduled by a DCI format 0_1 with CRC scrambled by a C-RNTI, the active UL BWP is a UL BWP (a UL BWP with index i) which is different from the initial UL BWP, and the resource block assignment information indicates one or more interlaces, the twenty-first resource blocks assigned for the PUSCH may be resource blocks included in the one or more interlaces in the active UL BWP. For example, if the twenty-first resource blocks are VRBs, the VRB with index n may be mapped to PRB with index n.

In the third solution, in the sixth case that the condition X is satisfied, the active UL BWP is the initial UL BWP, and the resource block assignment information indicates one or more interlaces, the twenty-second resource blocks assigned for the PUSCH may be resource blocks included in the one or more interlaces in the active UL BWP. For example, if the twenty-second resource blocks are VRBs, the VRB with index n may be mapped to PRB with index n.

In the third solution, in the seventh case that the condition X is not satisfied, the active UL BWP is a UL BWP (a UL BWP with index i) which is different from the initial UL BWP, and the resource block assignment information indicates one or more interlaces, the twenty-third resource blocks assigned for the PUSCH may be resource blocks included in the one or more interlaces in the active UL BWP. For example, if the twenty-third resource blocks are VRBs, the VRB with index n may be mapped to PRB with index n.

For example, in the third solution, the interlace allocation may be at least based on the relationship $I_L=\mathrm{mod}(I_{VRB}, N_M)$.

In the third solution, the seventeenth resource blocks may be the same as the twenty-second resource blocks in a case that the one or more interlaces indicated by the resource block assignment information is the same and the initial UL BWP includes different set of resource blocks from the UL BWP. In the third solution, the relationship for the interlace allocation may be set such that the seventeenth resource blocks and the twenty-second resource blocks are the same.

In the third solution, the seventeenth resource blocks may be different from the nineteenth (or twentieth, twenty-first, twenty-third) resource blocks in a case that the one or more interlaces indicated by the resource block assignment information is the same and the initial UL BWP includes different set of resource blocks from the UL BWP.

To accomplish the object described above, aspects of the present invention are contrived to provide the following measures. Specifically, the terminal device 1 according to a first aspect of the present invention includes reception circuitry configured to receive random-access response, and transmission circuitry configured to transmit a PUSCH in an active UL BWP with index i wherein the PUSCH is scheduled by a random-access response grant included in the random-access response, $M_L$ interlaces are configured for the active UL BWP, $I_L^{th}$ interlace in the $M_L$ interlaces includes a set of resource blocks with index $I_{VRB}$ each of which satisfies relationship $I_L=\mathrm{mod}(I_{VRB}+N^{start,u}_{BWP,i}, M_L)$, the $N^{start,u}_{BWP,i}$ is a starting common resource block of the active UL BWP with index i, resource block assignment information in the random-access response grant indicates one or more interlaces from the $M_L$ interlaces, a first resource blocks assigned for the PUSCH in a case that the active UL BWP is different from an initial UL BWP are resource blocks in the one or more interlaces in the initial UL BWP, and a second resource blocks assigned for the PUSCH in a case that the active UL BWP is the initial UL BWP are same as the first resource blocks.

Furthermore, the terminal device 1 according to a second aspect of the present invention includes reception circuitry configured to receive random-access response, and transmission circuitry configured to transmit a PUSCH in an active UL BWP with index i wherein the PUSCH is scheduled by a random-access response grant included in the random-access response, $M_L$ interlaces are configured for the active UL BWP, $I_L^{th}$ interlace in the $M_L$ interlaces includes a set of virtual resource blocks with index $I_{VRB}$ each of which satisfies relationship $I_L=\mathrm{mod}(I_{VRB}+N^{start,u}_{BWP,i}, M_L)$, resource block assignment information in the random-access response grant indicates one or more interlaces from the $M_L$ interlaces, assigned virtual resource blocks for the PUSCH are virtual resource blocks in the one or more interlaces in the active UL BWP with a limited bandwidth, a starting virtual resource block of the limited bandwidth is same as a starting resource block of an initial UL BWP, a virtual resource block with index n in the assigned virtual resource blocks is mapped to a physical resource block with index $n+N_{VRBtoPRB}$, in a case that the active UL BWP is different from the initial UL BWP, the $N_{VRBtoPRB}$, is given at least based on a part or all of $I^{start}_{L,0}$ and $I^{start}_{L,i}$, the $I_{start}^{L,0}$ is an interlace index of the starting resource block of the initial UL BWP, and the $I^{start}_{L,i}$ is an interlace index of the starting resource block of the active UL BWP.

Furthermore, the terminal device 1 according to a third aspect of the present invention includes reception circuitry configured to receive random-access response, and transmission circuitry configured to transmit a PUSCH in an active UL BWP with index i wherein the PUSCH is scheduled by a random-access response grant included in the random-access response, $M_L$ interlaces are configured for the active UL BWP, $I_L^{th}$ interlace in the $M_L$ interlaces includes a set of virtual resource blocks with index $I_{VRB}$ each of which satisfies relationship $I_L=\mathrm{mod}(I_{VRB}, M_L)$, resource block assignment information in the random-access response grant indicates one or more interlaces from the $M_L$ interlaces, assigned virtual resource blocks for the PUSCH are virtual resource blocks in the one or more interlaces in the active UL BWP with a limited bandwidth, a starting virtual resource block of the limited bandwidth is same as a starting resource block of an initial UL BWP, a virtual resource block with index n in the assigned virtual resource blocks is mapped to a physical resource block with index $n+N^{start}_{BWP,0}-N^{start}_{BWP,i}$, $N^{start}_{BWP,0}$ is a starting common resource block of the initial UL BWP, and $N^{start}_{BWP,i}$ is a starting common resource block of the active UL BWP.

Furthermore, the base station device 3 according to a fourth aspect of the present invention includes transmission circuitry configured to transmit random-access response, and reception circuitry configured to receive a PUSCH in an active UL BWP with index i wherein the PUSCH is scheduled by a random-access response grant included in the random-access response, $M_L$ interlaces are configured for the active UL BWP, $I_L^{th}$ interlace in the $M_L$ interlaces includes a set of resource blocks with index $I_{VRB}$ each of which satisfies relationship $I_L=\mathrm{mod}(I_{VRB}+N^{start,u}_{BWP,i}, M_L)$, the $N^{start,u}_{BWP,i}$ is a starting common resource block of the active UL BWP with index i, resource block assignment information in the random-access response grant indicates one or more interlaces from the $M_L$ interlaces, a first resource blocks assigned for the PUSCH in a case that the active UL BWP is different from an initial UL BWP are resource blocks in the one or more interlaces in the initial UL BWP, and a second resource blocks assigned for the PUSCH in a case that the active UL BWP is the initial UL BWP are same as the first resource blocks.

Furthermore, the base station device 3 according to a fifth aspect of the present invention includes transmission circuitry configured to transmit random-access response, and reception circuitry configured to receive a PUSCH in an active UL BWP with index i wherein the PUSCH is scheduled by a random-access response grant included in the random-access response, $M_L$ interlaces are configured for the active UL BWP, $I_L^{th}$ interlace in the $M_L$ interlaces includes a set of virtual resource blocks with index $I_{VRB}$ each of which satisfies relationship $I_L=\mathrm{mod}(I_{VRB}+N^{start,u}_{BWP,i}, M_L)$, resource block assignment information in the random-access response grant indicates one or more interlaces from the $M_L$ interlaces, assigned virtual resource blocks for the PUSCH are virtual resource blocks in the one or more interlaces in the active UL BWP with a limited bandwidth, a starting virtual resource block of the limited bandwidth is same as a starting resource block of an initial UL BWP, a virtual resource block with index n in the assigned virtual resource blocks is mapped to a physical resource block with index $n+N_{VRBtoPRB}$, in a case that the active UL BWP is different from the initial UL BWP, the $N_{VRBtoPRB}$ is given at least based on a part or all of $I^{start}_{L,0}$ and $I^{start}_{L,i}$, the $I^{start}_{L,0}$ is an interlace index of the starting resource block of the initial UL BWP, and the $I^{start}_{L,i}$ is an interlace index of the starting resource block of the active UL BWP.

Furthermore, the base station device 3 according to a sixth aspect of the present invention includes transmission circuitry configured to transmit random-access response, and reception circuitry configured to receive a PUSCH in an active UL BWP with index i wherein the PUSCH is scheduled by a random-access response grant included in the random-access response, $M_L$ interlaces are configured for the active UL BWP, $I_L^{th}$ interlace in the $M_L$ interlaces includes a set of virtual resource blocks with index $I_{VRB}$ each of which satisfies relationship $I_L=\mathrm{mod}(I_{VRB}, M_L)$, resource block assignment information in the random-access response grant indicates one or more interlaces from the $M_L$ interlaces, assigned virtual resource blocks for the PUSCH are virtual resource blocks in the one or more interlaces in the active UL BWP with a limited bandwidth, a starting virtual resource block of the limited bandwidth is same as a starting resource block of an initial UL BWP, a virtual resource block with index n in the assigned virtual resource blocks is mapped to a physical resource block with index $n+N^{start}_{BWP,0}-N^{start}_{BWP,i}$, $N^{start}_{BWP,0}$ is a starting common resource block of the initial UL BWP, and $N^{start}_{BWP,i}$ is a starting common resource block of the active UL BWP.

Each of a program running on the base station device 3 and the terminal device 1 according to an aspect of the present invention may be a program that controls a Central Processing Unit (CPU) and the like, such that the program causes a computer to operate in such a manner as to realize the functions of the above-described embodiment according to the present invention. The information handled in these devices is transitorily stored in a Random-Access-Memory (RAM) while being processed. Thereafter, the information is stored in various types of Read-Only-Memory (ROM) such as a Flash ROM and a Hard-Disk-Drive (HDD), and when necessary, is read by the CPU to be modified or rewritten.

Note that the terminal device 1 and the base station device 3 according to the above-described embodiment may be partially achieved by a computer. In this case, this configuration may be realized by recording a program for realizing such control functions on a computer-readable recording medium and causing a computer system to read the program recorded on the recording medium for execution.

Note that it is assumed that the "computer system" mentioned here refers to a computer system built into the terminal device 1 or the base station device 3, and the computer system includes an OS and hardware components such as a peripheral device. Furthermore, the "computer-readable recording medium" refers to a portable medium such as a flexible disk, a magneto-optical disk, a ROM, a CD-ROM, and the like, and a storage device built into the computer system such as a hard disk.

Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a fixed period of time, such as a volatile memory within the computer system for functioning as a server or a client in such a case. Furthermore, the program may be configured to realize some of the functions described above, and also may be configured to be capable of realizing the functions described above in combination with a program already recorded in the computer system.

Furthermore, the base station device 3 according to the above-described embodiment may be achieved as an aggregation (an device group) including multiple devices. Each of the devices configuring such an device group may include some or all of the functions or the functional blocks of the base station device 3 according to the above-described embodiment. The device group may include each general function or each functional block of the base station device 3. Furthermore, the terminal device 1 according to the above-described embodiment can also communicate with the base station device as the aggregation.

Furthermore, the base station device 3 according to the above-described embodiment may serve as an Evolved Universal Terrestrial Radio Access Network (E-UTRAN) and/or NG-RAN (Next Gen RAN, NR-RAN). Furthermore, the base station device 3 according to the above-described embodiment may have some or all of the functions of a node higher than an eNodeB or the gNB.

Furthermore, some or all portions of each of the terminal device 1 and the base station device 3 according to the above-described embodiment may be typically achieved as an LSI which is an integrated circuit or may be achieved as a chip set. The functional blocks of each of the terminal device 1 and the base station device 3 may be individually achieved as a chip, or some or all of the functional blocks may be integrated into a chip. Furthermore, a circuit integration technique is not limited to the LSI, and may be realized with a dedicated circuit or a general-purpose processor. Furthermore, in a case that with advances in semiconductor technology, a circuit integration technology with which an LSI is replaced appears, it is also possible to use an integrated circuit based on the technology.

Furthermore, according to the above-described embodiment, the terminal device has been described as an example of a communication device, but the present invention is not limited to such a terminal device, and is applicable to a terminal device or a communication device of a fixed-type or a stationary-type electronic device installed indoors or outdoors, for example, such as an Audio-Video (AV) device, a kitchen device, a cleaning or washing machine, an air-conditioning device, office equipment, a vending machine, and other household devices.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of one aspect of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

The invention claimed is:

1. A terminal device comprising:
reception circuitry configured to receive a Physical Downlink Control Channel (PDCCH) with a downlink control information (DCI) format with a Cyclic Redundancy Check (CRC) sequence scrambled by a Temporary Cell-Radio Network Temporary Identifier (TC-RNTI); and
transmission circuitry configured to transmit a Physical Uplink Shared Channel (PUSCH) scheduled by the (DCI) format; wherein
in a case that a first type frequency domain resource assignment is applied to the PUSCH, a frequency domain resource assignment field in the DCI format is used to determine a first set of virtual resource blocks for the PUSCH, where the first set including continuous virtual resource blocks and
in a case that a second type frequency domain resource assignment is applied to the PUSCH, the frequency domain resource assignment field is use to determine a second set including a set of interlaces, each of the interlaces including one or more virtual resource blocks;
a virtual resource block with index n in the first set is mapped to a physical resource block with index $n+N^{start}_{BWP,0}-N^{start}_{BWP,i}$ in a case that the first type frequency domain resource assignment is applied to the PUSCH, the $N^{start}_{BWP,0}$ being an index of a starting common resource block of an initial UL BWP, the $N^{start}_{BWP,i}$ being an index of a starting common resource block of the active UL BWP;
the virtual resource block with the index n is mapped to a physical resource block with index n, in a case that the second type frequency domain resource assignment is applied to the PUSCH.

2. A base station device comprising:
transmission circuitry configured to transmit a Physical Downlink Control Channel (PDCCH) with a downlink control information (DCI) format with a Cyclic Redundancy Check (CRC) sequence scrambled by a Temporary Cell-Radio Network Temporary Identifier (TC-RNTI); and
reception circuitry configured to receive a Physical Uplink Share Channel (PUSCH) scheduled by the DCI format; wherein
in a case that a first type frequency domain resource assignment is applied to the PUSCH, a frequency domain resource assignment field in the DCI format is used to determine a first set of virtual resource blocks for the PUSCH, where the first set including continuous virtual resource blocks and
in a case that a second type frequency domain resource assignment is applied to the PUSCH, the frequency domain resource assignment field is used to determine a second set including a set of interlaces, each of the interlaces including one or more virtual resource blocks;
a virtual resource block with index n in the first set is mapped to physical resource block with index $n+N^{start}_{BWP,0}-N^{start}_{BWP,i}$ in a case that the first type frequency domain resource assignment is applied to the PUSCH, the $N^{start}_{BWP,0}$ being an index of a starting common resource block of an initial UL BWP, the $N^{start}_{BWP,i}$ being an index of a starting common resource block of the active UL BWP;
the virtual resource block with the index n is mapped to a physical resource block with index n, in a case that the second type frequency domain resource assignment is applied to the PUSCH.

3. A communication method used by a terminal device, the communication method comprising the steps of:
receiving a Physical Downlink Control Channel (PDCCH) with a downlink control information (DCI) format with a Cyclic Redundancy Check (CRC) sequence scrambled by a Temporary Cell-Radio Network Temporary Identifier (TC-RNTI); and
transmitting a Physical Uplink Shared Channel (PUSCH) scheduled by the DCI format; wherein
in a case that a first type frequency domain resource assignment is applied to the PUSCH, a frequency domain resource assignment field in the DCI format is used to determine a first set of virtual resource blocks for the PUSCH, where the first set including continuous virtual resource blocks and
in a case that a second type frequency domain resource assignment is applied to the PUSCH, the frequency domain resource assignment field is used to determine a second set including a set of interlaces each of the interlaces including one or more virtual resource blocks;

a virtual resource block with index n in the first set is mapped to physical resource block with index $n+N^{start}_{BWP,0}-N^{start}_{BWP,i}$ in a case that the first type frequency domain resource assignment is applied to the PUSCH, the $N^{start}_{BWP,0}$ being an index of a starting common resource block of an initial UL BWP, the $N^{start}_{BWP,i}$ being an index of a starting common resource block of the active UL BWP;

the virtual resource block with the index n is mapped to a physical resource block with index n, in a case that the second type frequency domain resource assignment is applied to the PUSCH.

* * * * *